United States Patent
Dhar et al.

(10) Patent No.: US 10,200,397 B2
(45) Date of Patent: Feb. 5, 2019

(54) ROBUST MATCHING FOR IDENTITY SCREENING

(71) Applicant: Microsoft Technology Licensing, LLC, Redmond, WA (US)

(72) Inventors: Surajit Dhar, Hyderabad (IN); Disha Dhingra, Hyderabad (IN); Kris K. Ganjam, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 73 days.

(21) Appl. No.: 15/195,923

(22) Filed: Jun. 28, 2016

(65) Prior Publication Data
US 2017/0374093 A1    Dec. 28, 2017

(51) Int. Cl.
| G06F 11/00 | (2006.01) |
| H04L 29/06 | (2006.01) |
| G06F 17/30 | (2006.01) |
| G06Q 50/26 | (2012.01) |

(Continued)

(52) U.S. Cl.
CPC ........ H04L 63/1433 (2013.01); G06F 17/277 (2013.01); G06F 17/3061 (2013.01); G06F 17/30663 (2013.01); G06F 21/30 (2013.01); G06Q 50/265 (2013.01)

(58) Field of Classification Search
CPC ... G06F 21/577; G06F 17/277; H04L 63/1433
See application file for complete search history.

(56) References Cited

U.S. PATENT DOCUMENTS

| 7,328,211 B2 | 2/2008 | Bordner et al. |
| 7,403,942 B1 * | 7/2008 | Bayliss ............ G06F 17/30303 707/748 |
| 7,610,283 B2 | 10/2009 | Arasu et al. |

(Continued)

OTHER PUBLICATIONS

Ananthakrishna et al., "Eliminating Fuzzy Duplicates in Data Warehouses," In Proceedings of the 28th international conference on Very Large Data Bases, Aug. 20, 2002, 12 pages.

(Continued)

*Primary Examiner* — Ali S Abyaneh
(74) *Attorney, Agent, or Firm* — Drinker Biddle & Reath LLP

(57) ABSTRACT

The techniques described herein are directed to robust matching for identity screening. In some examples, the techniques can include generating a similarity score for received identity information compared to a reference record. In some examples, the techniques can utilize a region associated with the received identity information to weight tokens composing the identity information or of the reference record to adjust the similarity score. Moreover, the techniques can include multiple tokenizers, transformation providers, and token weight providers and the techniques can be configured to select between the multiple tokenizers, transformation providers, and token weight providers based at least in part on a region to improve the accuracy of the similarity score. The techniques can determine whether or not to flag or otherwise affirm an identity of an individual or entity associated with the entity information based at least in part on the similarity score.

18 Claims, 6 Drawing Sheets

(51) Int. Cl.
*G06F 17/27* (2006.01)
*G06F 21/30* (2013.01)

(56) References Cited

U.S. PATENT DOCUMENTS

| | | | |
|---|---|---|---|
| 7,742,970 B2 | 6/2010 | Thierer et al. | |
| 8,050,906 B1 | 11/2011 | Zimmerman et al. | |
| 8,346,791 B1* | 1/2013 | Shukla | G06F 17/30864 707/759 |
| 8,606,771 B2 | 12/2013 | Arasu et al. | |
| 9,317,544 B2* | 4/2016 | Ganjam | G06F 17/30303 |
| 9,367,814 B1 | 6/2016 | Lewis et al. | |
| 9,805,072 B2* | 10/2017 | Spiess | G06F 17/30303 |
| 9,912,731 B2* | 3/2018 | Kaushik | G06F 9/00 |
| 2004/0260694 A1 | 12/2004 | Chaudhuri | G06F 17/30542 |
| 2006/0053133 A1 | 3/2006 | Parkinson | |
| 2007/0106686 A1 | 5/2007 | Shank et al. | |
| 2008/0183693 A1 | 7/2008 | Arasu et al. | |
| 2009/0019032 A1 | 1/2009 | Bundschus et al. | |
| 2009/0037403 A1* | 2/2009 | Joy | G06F 17/3087 |
| 2009/0150370 A1 | 6/2009 | Christensen et al. | |
| 2009/0210418 A1* | 8/2009 | Arasu | G06F 17/30569 |
| 2009/0285474 A1 | 11/2009 | Berteau | |
| 2011/0276577 A1* | 11/2011 | Yao | G06F 17/30702 707/749 |
| 2012/0278336 A1 | 11/2012 | Malik et al. | |
| 2013/0091120 A1 | 4/2013 | Ganjam et al. | |
| 2014/0052688 A1 | 2/2014 | Bansal | |
| 2016/0110446 A1 | 4/2016 | Lightner et al. | |
| 2017/0371958 A1 | 12/2017 | Ganjam et al. | |

OTHER PUBLICATIONS

Arasu et al., "Efficient Exact Set-Similarity Joins," In Proceedings of the 32nd international conference on Very large data bases, Sep. 12, 2006, pp. 918-929.

Arasu et al., "Experiences with using Data Cleaning Technology for Bing Services," In Proceedings of IEEE Computer Society Technical Committee on Data Engineering, vol. 35, No. 2, Jun. 2012, pp. 1-10.

Arasu et al., "Towards a Domain Independent Platform for Data Cleaning," In Proceedings of Bulletin of the IEEE Computer Society Technical Committee on Data Engineering, vol. 34, No. 3, Sep. 2011, pp. 1-8.

Arasu et al., "Transformation-based Framework for Record Matching," In Proceedings of the IEEE 24th International Conference on Data Engineering, Apr. 7, 2008, 10 pages.

Bjones, "Identity as a Service Microsoft," Retrieved on: Feb. 15, 2016, Available at: <<http://www.gsebelux.com/system/files/2012_09_07%20Identity%20as%20a%20Service.pdf>> 31 pages.

Chaudhuri et al., "Robust and efficient fuzzy match for online data cleaning," In Proceedings of Proceedings of the ACM SIGMOD international conference on Management of data, Jun. 9, 2003, 12 pages.

"Consolidated Screening List API," Published on: Aug. 12, 2015, Available at: <<http://developer.trade.gov/consolidated-screening-list.html>> 17 pages.

"Denied Trade Screening," Retrieved on: Feb. 11, 2016, Available at: <<https://en.wikipedia.org/wiki/Denied_trade_screening>> 2 pages.

"Descartes MK Denial," Retrieved on: Feb. 11, 2016, Available at: <<https://www.mkdenial.com/>> 2 pages.

Eber et al., "Challenges and trends in identity matching," Retrieved on: Feb. 15, 2016, Available at: <<http://www2.deloitte.com/content/dam/Deloitte/lu/Documents/risk/lu-challenges-trends-identity-matching-30102014.pdf>> 4 pages.

El-Shishtawy, "Linking Databases using Matched Arabic Names," In Journal of Computational Linguistics and Chinese Language Processing, vol. 19, Issue 1, Mar. 2014, pp. 33-54.

"Federal Cloud Credential Exchange (FCCX)," Retrieved on: Feb. 11, 2016, Available at: <<http://about.usps.com/news/secure-digital/welcome.htm>> 1 page.

"Federated Identity with Microsoft Azure Access Control Service," Retrieved on: Feb. 15, 2016, Available at: <<https://msdn.microsoft.com/en-us/library/hh446535.aspx<< 17 pages.

"Global Trade Management and the Cloud—Does It Work?" Published on: Feb. 2014, at: <<http://www.bpdelivery.com/wp-content/uploads/2014/02/The-Supply-Chain-Cloud.pdf>> 26 pages.

Htun et al., "Cross-language Phonetic Similarity Measure on Terms Appeared in Asian Languages," In International Journal of Intelligent Information Processing, vol. 2, No. 2, Jun. 2011, pp. 9-21.

"Infosys oracle GTM cloud solution," Retrieved on: Feb. 25, 2016, Available at: <<https://www.infosys.com/Oracle/offerings/Documents/global-trade-management.pdf>> 4 pages.

"Intredex Export Compliance—Denied & Restricted Party Screening," In White Pager of Intredex, Jul. 2014, 3 pages.

Irmen, "10 Ways to Reduce the Cost, Risk of Global Trade," In the Journal of Commerce, Apr. 8, 2009, 2 pages.

"Latest Release of SAP Global Trade Services Introduces New Foreign Trade Zone and Screening Capabilities," Published on: Jun. 18, 2015, Available at: <<http://news.sap.com/latest-release-of-sap-global-trade-services-introduces-new-foreign-trade-zone-and-screening->> 6 pages.

Loro et al., "Indexing and Selecting Hierarchical Business Logic," In Proceedings of Very Large Data Bases Endowment, vol. 8, No. 12, Aug. 31, 2015, pp. 1656-1667.

"OFAC Name Matching and False-Positive Reduction Techniques," Published on: Jul. 2014, Available at: <<http://www.cognizant.com/InsightsWhitepapers/OFAC-Name-Matching-and-False-Positive-Reduction-Techniques-codex1016.pdf>> 13 pages.

"Oracle Transportation and Global Trade Management Cloud," Published on: Aug. 2014, Available at: <<http://www.oracle.com/us/products/applications/transportation-global-trade-2291963.pdf>> 2 pages.

"Periodic Business Partner Check in Positive/Negative List," Published on: Jul. 10, 2015, Available at: <<https://help.sap.com/saphelp_gts10/helpdata/en/4c/51a5a671474d4ae10000000a15822b/content.htm>> 3 pages.

"Precision and recall," Retrieved on: Feb. 15, 2016, Available at: <<https://en.wikipedia.org/wiki/Precision_and_recall>> 4 pages.

Treeratpituk et al., "Name-Ethnicity Classification and Ethnicity-Sensitive Name Matching," In Proceedings of the Twenty-Sixth AAAI Conference on Artificial Intelligence, Jul. 22, 2012, pp. 1141-1147.

Udupa et al., "Hashing-based Approaches to Spelling Correction of Personal Names," In Proceedings of the Conference on Empirical Methods in Natural Language Processing, Oct. 9, 2010, pp. 1256-1265.

Winkler, "Matching and Record Linkage," In Journal of Business survey methods, vol. 1, Mar. 1995, pp. 1-38.

Zheng, "The MITRE Name Matching Challenge," Retrieved on: Feb. 15, 2016, Available at: <<http://www.mathcs.emory.edu/~lxiong/cs570_s11/share/project/Shuai_MITRE.pdf>> 11 pages.

"International Search Report and Written Opinion Issued in PCT Application No. PCT/US2017/038631", dated Aug. 2, 2017, 13 Pages.

* cited by examiner

ROBUST MATCHING FOR IDENTITY SCREENING

BACKGROUND

Identity and entity screening is vital to a variety of applications where ensuring that provided identity information, such as a name, corresponds to a particular individual or entity. Such applications include background checks, identity theft investigations, Transportation Security Authority (TSA) screening, enterprise administrator authentication, networked resource access, etc. Current systems for identity screening produce high rates of false positives (i.e., incorrectly affirming that identity information corresponds to a particular individual or entity) and false negatives (i.e., failing to affirm that identity information corresponds to a particular individual or entity). Sparse identity information (e.g., a name without any corroborating information) and common identity information (e.g., John Smith or ACME, Inc. in the United States) only worsen false positive and false negative screening rates.

SUMMARY

This summary is provided to introduce simplified concepts relating to cross-mode communication. This summary is not intended to identify essential features of the claimed subject matter, nor is it intended for use in determining the scope of the claimed subject matter.

The techniques described herein are directed to robust matching for identity screening. The techniques are robust in that they can be match tokens originating from disparate regions and/or languages while providing a control probability indicating that all matches have been found within a given threshold error rate (e.g., a probability that the techniques return a false positive and/or false negative). Moreover, the techniques result in lower false negative and false positive rates than former solutions and the techniques are extensible and scalable. In some examples, a user may be asked to provide identity information such as, for example, a name, an address, a sex, biometric information, a username, an identification number, or some combination thereof. The techniques can include generating a similarity score for received identity information compared to a reference record. In some examples, the techniques can utilize a region associated with the received identity information and/or the reference record to weight tokens composing the identity information to adjust the similarity score. Moreover, the techniques can include selecting between multiple tokenizers, transformation providers, and/or token weight providers based at least in part on a region to improve the accuracy of the similarity score. The techniques can determine whether or not to flag or otherwise affirm an identity of an individual or entity associated with the entity information based at least in part on the similarity score.

The techniques discussed herein can improve the security of computing devices, computing networks, and by reducing false positive and false negative rates when attempting to verify an entity's identity. By allowing a user to set a risk tolerance value and accordingly providing a control probability that indicates that the results conform to the risk tolerance value, the techniques also solve a problem inherent to computing: users rarely or never have concrete knowledge of the performance of an identity screening service without performing experimentation by providing ground truths to the service and sampling the outputs of the service. The accuracy of such experimentation is highly limited, however. These techniques solve this problem by allowing a user to set a risk tolerance value and/or by providing a control probability that the system has found all matches at a certain false positive and/or false negative rate. Moreover, the techniques can improve multiple technical fields from access control, computer networking, computing, to any field for which falsely positively or falsely negatively identifying an entity serves as a detriment (e.g., any exchange between two parties where one or more of the parties bears a risk in the exchange).

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
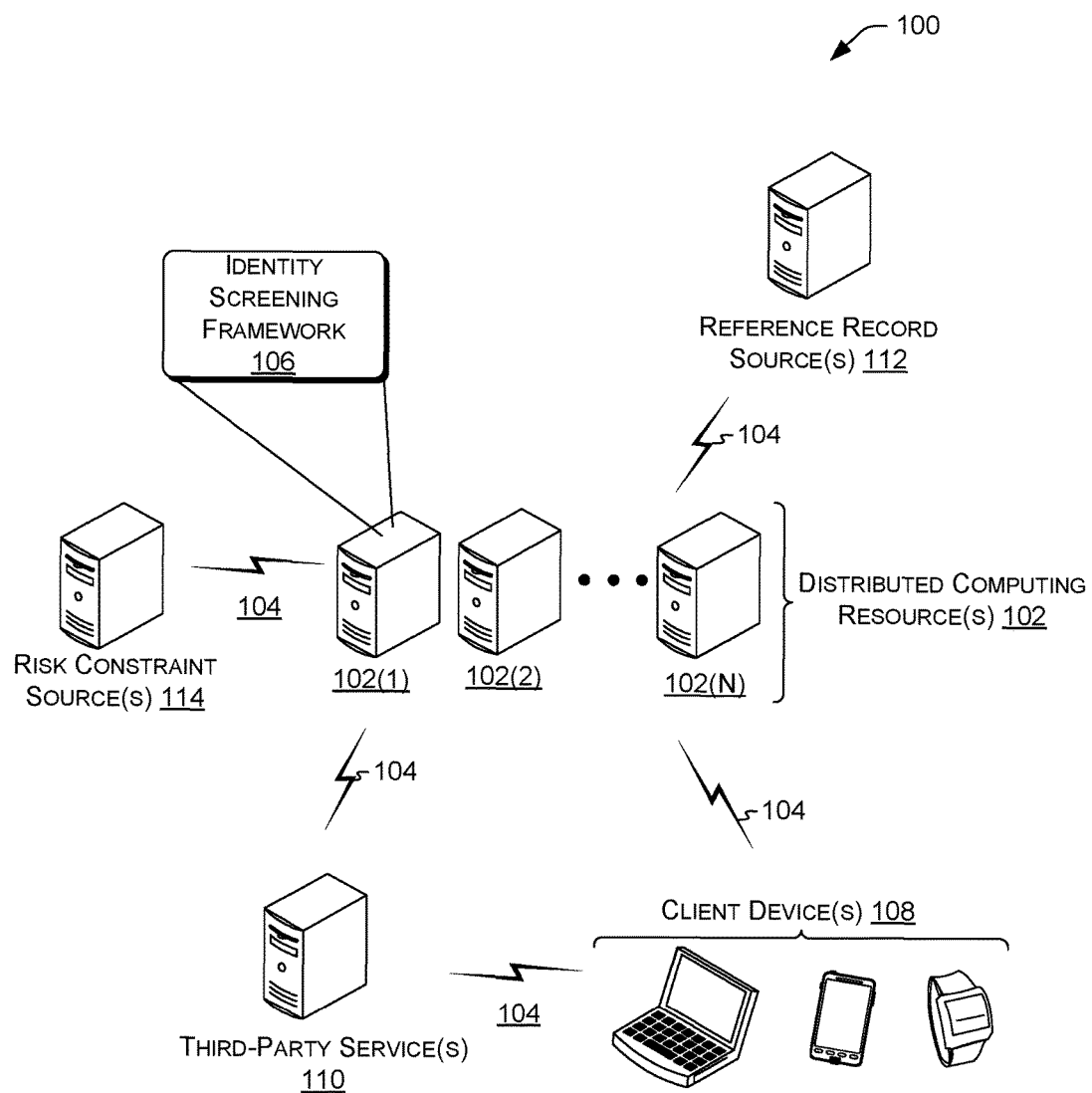
FIG. 1 is a block diagram depicting an example environment in which examples of robust matching for identity screening can operate.

This disclosure can, in some examples, provide robust matching for identity screening. The techniques discussed herein improve false negative and false positive rates, provide multi-lingual screening, provide multi-region screening, and facilitate real-time and/or mobile identity screening. In some examples, the techniques can include a region and/or language identifier, a domain manager, region and/or language-specific tokenizers, transformation providers, token weight providers, comparers, and/or a decision provider.

As used herein, a "token" can be an individual occurrence of a linguistic unit such as, for example, a symbol, a letter, a prefix, a suffix, a root word, a word, a string, or any combination thereof. For example, "John Smith, 123 Main Ave., Denver, Colo."; "John Smith", "123 Main Ave", "Denver, Colo.", "John", "Smith", and "123" are all tokens. Tokens are not limited to natural linguistics and can comprise data. For example, "USERNAME-DESKTOP,00:0a: 95: 9d: 68:16, 74.136.2.1" can be a token as well. A "token" can also be a token. As used herein, "tokenizing" is breaking up a string. For example, one tokenization scheme can tokenize "John Smith" into the tokens "John" and "Smith." As used herein, a "tokenizer" can be hardware and/or software that implements a particular tokenization scheme (i.e., a specified method of tokenizing strings). As used herein, a "tolerated risk value" includes a "control probability."

In some examples, a service receives identity information such as, for example, name(s), address(es), identification number(s), birthdate(s), issue date(s), expiration date(s), association(s), etc. The identity information can correspond to an entity such as, for example, person(s), corporation(s), domain(s), or the like. In some examples, the service receives, retrieves, obtains, and/or stores a reference record such as, for example, a list of identity information corresponding to entities. Reference records can include, for example, travel blacklists, region blacklists (e.g., embargoed nations, quarantined networked resources, physical or digital area permissions, etc.), census information, birth records, social security information, whitelists, postal information, entity formation records, etc. In some examples the identity information and/or the reference record can be associated with a region. The region can be a physical region (e.g., coordinates, an address, a neighborhood, a city, a county, a state/province, a country, etc.), a political region, a cultural region (e.g., an area occupied by a people group), and/or a digital region such as, for example, part of a network domain or a region of the Internet.

An association between a region and identity information and/or a reference record can be patent or latent. A region and/or language identifier can identify patent associations and discover latent associations. Patent associations can include, for example, a reference record specific to a region (e.g., a United States travel blacklist, state birth records, a United Nations restrictions list, etc.) and/or patent associations between identity information and a region such as an address submitted (i.e., a region) with a name (i.e., identity information) in a form, region information that exists in a same row or column of a table as identity information, etc. In some examples, the identity information received includes region data, such as an address, which would be an example of a patent association of the region data with the identity information. Latent associations can include, for example, regions that can be inferred from received or retrieved data such as the identity information or a form or service providing the identity information, a language associated with the identity information and/or a reference record, a language associated with the identity information, a region and/or language associated with a name (e.g., João is the Portuguese equivalent of John and may therefore be latently associated with countries, cities, provinces, etc. where Portuguese is more predominantly spoken), a region associated with the screening (e.g., a physical screening location such as an airport checkpoint, a travel destination, a current location or previously visited locations of a potential victim of identity fraud, etc.), etc.

In some examples, a service receives identity information and identifies and/or receives region data associated with the identity information. In some examples, the service can then retrieve reference record(s) that corresponds with region(s) associated with the identity information. For example, the identity information can include a name and address and the identity screening can be conducted for a destination region. The service can receive the address and the destination region and identify various latently associated regions, which the service can use to retrieve reference records that correspond with the regions. In some examples, the service can retrieve reference records based at least in part on a purpose or type of the identity screening, the region(s), and/or a combination thereof. For example, for an identity screening scenario for international flights the service can retrieve travel blacklists for a passport country, a flight origin country, and a flight destination country.

In some examples, the service can include a domain manager that can select tokenizer(s), token weight provider(s), and token weight provider(s); track instantiated objects (e.g., selected tokenizer(s), etc.); manage a mapping table between token strings and token identifications composing a domain; and/or relay data between various providers (e.g., the transformation provider can generate an internal dictionary of distinct token strings in a reference table and the token weight provider can assign token weights based upon relative frequencies of tokens in the reference table), etc.

In some examples, the service also selects one or more tokenizers associated with the region and/or language associated with the region, the identity information, and/or the reference record(s). In some examples, the service stores or otherwise has access to multiple tokenizers corresponding to various regions and/or languages. In some examples, the various combinations of regions and languages can correspond to tokenizers that tokenize strings based on different languages, dialects, and/or idiomatic patterns of a particular language and/or region. For example, the tokenizers can be configured to tokenize for different languages, and multiple tokenizers can be configured to tokenize strings based on different regions. For example, the tokenizers can be configured to tokenize based on variations in vocabulary, grammatical idiosyncrasies, slang, etc. that varies between regions (e.g., a tokenizer for Spanish versus a tokenizer for English, a tokenizer that can handle Unicode inputs such as Japanese symbols, a tokenizer for Castilian Spanish versus a tokenizer for Mexican Spanish, a tokenizer for the Castilian Spanish of Barcelona (a city of Spain heavily influenced by Catalonian culture) that incorporates some Catalan vocabulary and grammar versus a tokenizer for Castilian Spanish of Malaga (another city of Spain heavily influenced by former Arabic rule and trade) that incorporates some Arabic and Andalusi Romance vocabulary).

In some examples, one or more tokenizers are selected, based at least in part on a region, language, and/or purpose of the screening, by the service to tokenize a query string (e.g., the identity information and/or the reference record) into query tokens. In some examples, the tokenizer can tokenize the reference record and/or other retrieved strings. In some examples, a tokenizer transforms a text-based record into a set of tokens. Tokens can be individual words, strings, or sub-words. Different tokenizers can define word boundaries differently (e.g., tokenize based on white space, natural language word breakers, etc.). In some examples, the tokenizer(s) can break the string up into words recognized as part of the vocabulary of the language corresponding to the region and/or language. In some examples, the tokenizer(s) can break the string up into multiple words or portions of words. Tokenization patterns can vary across languages, regions, and/or purposes of the screening. Creating multiple tokenizers corresponding to different languages, regions, and/or purposes and selecting appropriate tokenizer(s) based at least in part on language(s), region(s), and/or purpose(s) can remedy the disparities in tokenization methods. Moreover, some tokenizers can account for particular language, region, and/or purpose crossovers. For example, English words may appear in the Russian language and may be tokenized differently by a "Russian" tokenizer than by an "English" tokenizer. A crossover tokenizer can account for one or both of the tokenization schemes and/or further information such as, for example, that the identity screening is being conducted in a United States Embassy in East Ukraine (e.g., the tokenizer can account for tokenization idiosyncrasies of tokenizing Russian in English, English in Russian, and/or either or both languages in Ukraine).

In some examples, the service can provide one or more of a region, a language, a screening purpose, and/or the query tokens to a transformation provider. The transformation provider can generate transformation rules based at least in part on the region, the language, the screening purpose, and/or the query tokens. The transformation rules can comprise language-and/or region-specific rules to modify tokens to account for language(s), region(s), and/or or screening purpose(s), such as by translating, transliterating, generating abbreviation expansions (e.g., "USA"→"United States of America,"→"Will"→"Bill for English, "Ahmed"→"Mohammed" for Arabic, "João"→"John" for a Portuguese/English use case, etc.), generating synonyms, transforming prefixes (e.g., "J. Smith"→"John Smith" when John Smith appears in the reference record), data cleaning, or otherwise modifying received query tokens. In some examples, the transformation provider can generate the transformation rules to apply based at least in part on an edit distance of the transformed token from the original token. An edit distance is a quantification of how dissimilar two tokens are to one another. In some examples, an edit distance is quantified by counting the minimum number of operations required to transform one token into the other. In some examples the Wagner-Fischer algorithm, Levensthein's algorithm, Hirschberg's algorithm, approximate string matching (e.g., Aho-Corasick algorithm), and/or the Levenshtein automata can be used to quantify edit distance. Transformation rules that would result in an edit distance above a threshold may be rejected whereas transformation rules resulting in an edit distance below the threshold may be used.

In some examples, the service can select a subset of the generated transformation rules to improve performance of the identity screening (e.g., by reducing processing time and storage requirements). For example, the service can rank the generated transformation rules based at least in part on the query tokens, the reference record, the region, edit distances of resultant tokens from the query tokens, synonym costs, and/or language. After ranking the generated transformation rules, the service can select the top k transformation rules, where k is a number chosen based at least in part on processing time constraints, storage constraints, desired false positive/false negative rates (e.g., risk tolerance), etc. The service can transform the query tokens based on the generated transformation rules or a subset of the transformation rules. In some examples, the service can addend the transformed query tokens to the query tokens to form a "query record." However in other examples, most or all of the generated transformation rules can be utilized.

In some examples, the transformations can be the same, similar, and/or different for "left hand side" (LHS) records (e.g., query records) and "right-hand side" (RHS) records (e.g., reference records). In some examples, transformation rules are not applied to transformed query tokens to avoid creating tokens that have a high probability of being unrelated and thereby increasing false positive rates. In some examples, the transformation rules can be bi-directional (e.g., "USA"→"United States of America" and "United States of America"→"USA"), in which case, the transformation provider can apply one of the two rules. In some examples, a number of the subset of transformation rules for the LHS can be a greater number than the number of the subset of transformation rules for the RHS. Having too many transformation rules for the RHS can create an overly large reference record that impedes performance and can lead to increased false positives. In some examples, the number for the LHS can be equal or less than the number for the RHS.

In some examples, a token weight provider can assign weights for query tokens of the query record, whether transformed query tokens and/or query tokens, based at least in part on one or more of the region, the language, transformation rules applied, and/or the reference record. For example, the token weight provider can calculate one or more of a term frequency, an inverse document frequency, and/or a term-frequency—inverse document frequency or other suitable numerical statistics that reflect the importance and/or commonality of a term within a corpus such as the reference record, a list of entity names of a region and/or language, and/or a vocabulary of a language.

In some examples, the token weight provider can also assign transformation costs for query tokens based on transformation rules used to obtain the query terms. In some examples, a transformation that radically changes a query token can have a high cost, whereas a transformation that only slightly modifies a query token can have a low cost. For example, transforming "Willam" to "William" can have a low transformation cost whereas transforming "William" to "Henry" or "Bill" can have a high transformation cost. However, mitigating factors can reduce transformation costs such as, for example, the existence of a region and/or language-specific synonym rule or contextual data. For example, in English "Bill" is a common nickname for "William" and therefore a synonym rule memorializing this association can be generated by the transformation provider and accordingly have a low transformation cost.

In some examples, the token weight provider can reduce the transformation cost based on contextual data. For example, a transformation of "Bill" to "Henry" may carry a high transformation cost because the tokens do not share many commonalities, but contextual data (e.g., from the query record, the reference record, and/or another source) comprising a token string, "Bill Henry Gates," can mitigate the transformation cost. In some examples, synonym transformations can have a first cost, data cleaning transformations can have a second cost based at least in part on an edit distance, and transformations based on contextual data can have a third cost associated therewith.

In some examples, the token weight provider can assign uniform weights to each token. In some examples, the token weight provider can store custom weights specified for particular tokens.

In some examples, the service can include a signature generator that uses a set of tokens, token weights, and a set of matching rules to generate one or more integer signatures. In some examples, the signatures are generated such that if any two records of a similarity exceeding a certain threshold (e.g., a Jaccard similarity coefficient values or a Jaccard Containment similarity) they will have a high probability of having at least one signature in common. In some examples, signature generators can use locality sensitive hashing (LSH) to generate signatures for indexing Jaccard similarity. In some examples, the signature generators can control probability include a control probability that the comparer will find all matches above a given threshold. This control probability can be used to fix the false negative probability and, as such, allow a user of the service to accept a risk tolerance associated with the false negative probability. In some examples, the service can allow a user to define a risk tolerance or modify a default risk tolerance. For example, the service can have a default risk tolerance value of 5%, but the service can allow a user to change the risk tolerance value, which modifies corresponding variables of the signature generator to correspond with the new false negative probability.

In some examples, the service can additionally or alternatively use a prefix signature generator to generate signatures that conform to the control probability (e.g., the signatures are generated such that the system can indicate that all matches have been found within a given threshold error rate (e.g., the risk tolerance value) and at a specified threshold of similarity). In some examples the prefix signature generator can index Jaccard Containment similarity in addition to Jaccard similarity.

In some examples, the service can include a comparer configured to determine similarity values between query tokens of the query record and entries (e.g., tokens) in the reference record. In some examples, the comparer can be a fuzzy comparer. For example, the fuzzy comparer can be an object programmed to evaluate the similarity of two records without needing to build an index, such as the fuzzy joins system described in Patent Application Publication No. 2013/0091120. In some examples, the comparer can account for the transformation costs in calculating similarity values corresponding to the similarity of the two records. In some examples, the similarity can be a Jaccard similarity. In other examples, the similarity can be a Jaccard Containment similarity or other metric quantifying similarity or diversity of a sample set.

In some examples, the service can also include a screening decision provider that can use a variety of factors to decide whether to return a positive or a negative identification of an entity associated with an entry of the reference record. A positive identification signifies that the service is affirming that the received identity information corresponds to an entity associated with tokens composing an entry in a reference record. In some examples, a negative identification can signify that the central system cannot guarantee an affirmation of identity. In other examples, a negative identification can signify an affirmation that the identity information does not correspond to any entries in the reference record.

In some examples, a positive identification can include flagging an entity supplying the identification information (e.g., flagging a traveler for travel restrictions pertinent to that traveler, etc.). In some examples, a positive identification can include granting an entity supplying the identification permissions (e.g., allowing the entity to access resources over a network, allowing the entity to pass a security check, etc.). In some examples, a positive identification can be used as verification of the entity's identity.

In some examples, factors that the screening decision provider can use to make a decision to return a positive or a negative identification can include a similarity score derived by the comparer, screening context (e.g., sensitivity of resource to which access is requested, type of blacklist, legal ramifications of screening, etc.), estimated region data, contextual data (e.g., social network information, inferred data from various sources such as a picture, etc.), etc.

The term "techniques" can refer to system(s), method(s), computer-readable media encoded with instructions, module(s), and/or algorithms, as well as hardware logic (e.g., field-programmable gate arrays (FPGAs), application-specific integrated circuits (ASICs), application-specific standard products (ASSPs), system-on-a-chip systems (SOCs), complex programmable logic devices (CPLDs)), etc. as permitted by the context described above and throughout the document.

Illustrative Environment

FIG. 1 is a block diagram depicting an example environment 100 in which examples described herein can operate. In some examples, the various devices and/or components of environment 100 include distributed computing resources 102 that can communicate with one another and with external devices via one or more networks 104. In at least one example, the distributed computing resources 102 can implement the techniques described herein. For example, the distributed computing resource(s) 102 can be the service described above that implements identity screening. In order to implement identity screening, the distributed computing resource(s) 102 can store thereon an identity screening framework ("ISF," herein), such as ISF 106, or can communicate via network 104 with a remotely stored ISF. In some examples, some or all of the techniques described for the distributed computing resource(s) 102 can additionally or alternatively be implemented by one or more client device(s) 108. In some examples, a client device 108 can be programmed with the ISF to implement the techniques described herein. In some examples, the ISF can be part of a web service, accessible by an application programming interface (API).

In various examples, distributed computing resource(s) 102 include computing devices such as distributed computing resource(s) 102(1)-102(N). Examples support scenarios where distributed computing resource(s) 102 can include one or more computing devices that operate in a cluster and/or other grouped configuration to share resources, balance load, increase performance, provide fail-over support and/or redundancy, and/or for other purposes. Although illustrated as desktop computers, distributed computing resource(s) 102 can include a diverse variety of device types and are not limited to any particular type of device. For example, distributed computing resource(s) 102 can include any type of computing device having one or more processing unit(s) operably connected to computer-readable media, I/O interfaces(s), and network interface(s). The computer-readable media can have a ISF 106 stored thereon or a framework to relay communication to and from a remotely stored ISF 106.

In some examples, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communication protocols, including packet-based and/or datagram-based protocols such as interne protocol (IP), transmission control protocol (TCP), user datagram protocol (UDP), and/or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

Example environment 100 also includes client device(s) 108. In some examples, the client device(s) 108 can include, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device such as one or more separate processor device(s), such as CPU-type processors (e.g., micro-processors), GPUs, or accelerator device(s).

The client device(s) 108 can be any device by which a user provides identity information to the distributed computing resource(s) 102 for identity screening in an implementation where the ISF is stored at the distributed computing resource(s) 102. In some examples, the client device(s) 108 can be configured to receive identity information of various types. For example, the client device(s) 108 can be configured to display an interface for inputting textual identity information which the client device(s) 108 can relay to the ISF, capture an image to relay to the ISF (e.g., a picture of an individual, an image of a passport, a picture of the outside of a business, etc.), obtain GPS coordinates to relay to the ISF, retrieve data from a third-party service(s) 110 (e.g., flight and/or passenger information from a secure airlines server; corporate entity information such as chief officers, office locations, employee lists, etc.); obtain biometric data from an individual to include with the identity information; etc.

In some examples, the third-party service(s) 110 can include identity service providers. Identity service providers can include digital passport services, authenticated credentials providers (e.g., U-Prove, PKI-based systems), secure databases (e.g., social security information service, credit report service, criminal records service, etc.), and/or auxiliary disambiguation services (discussed below in regard to at least 324). In some examples, the identity service providers can provide claims-based credentials and/or attribute-based credentials. In some examples, the identity service provider is integrated into the ISF by access to an API stored within the ISF.

The environment 100 includes third-party service(s) 110. Third-party service(s) 110 can be associated with a screening entity (e.g., the TSA, an enterprise), a component of the ISF (e.g., a mapping service such as the Bing® Maps API that the region and/or language identifier uses, a list of vocabulary and/or names of a language that the tokenizer, transformation provider, token weight provider, and/or decision provider leverage, etc.). In some examples, the third-party service(s) 110 and the reference record source(s) 112 may be the same (e.g., travelling blacklists accessible to or stored by a TSA system). In some examples, the third-party service(s) 110 can be integrated into the distributed computing resource(s) 102. In some examples, reference records retrieved from reference record source(s) 112 can be stored at the distributed computing resource(s) 102. In some examples, the ISF tokenizes, transforms, and weights the reference record, as discussed above. This modified reference record can be stored at the distributed computing resource(s) 102 to reduce processing and, subsequently, screening decision times.

The environment 100 can further include reference record source(s) 112. The reference record source(s) 112 can vary widely depending on the identity screening application. For example, in an example where the identity screening is used to screen users requesting for access to a networked resource, the reference record source(s) could include sources storing employee lists, registered user information, business formation records, IP address/entity blacklists, etc. In a travel screening scenario, the reference record source(s) could include sources storing travel blacklists, international travel embargos, criminal record database data, etc. In an identity theft scenario, the reference record source(s) could include sources storing census information, state or professional licensing information, birth records, social security information, Internal Revenue Service data, residence information, social network affiliations, etc. In that use scenario, the reference records can comprise any records that, if a match was conclusively established, would verify an individual's identity.

The environment 100 can further include risk constraint source(s) 114. The risk constraint source(s) 114 can be used by the decision provider of the ISF to decide whether or not to affirm that received identity information corresponds with an entity in a reference record (e.g., received identity information corresponds with a user allowed to access a networked resource, received identity information corresponds with an individual that appears on a list of travel-restricted individuals, received identity information corresponds with an individual who may have been the victim of identity theft, received identity information corresponds with a corporate entity in a list, etc.). In some use cases, the decision to affirm or deny that identity information corresponds with an entity described by reference record data can be influenced by the ramifications of choosing to flag identity information. For example, in some uses cases, there can be legal constraints, fines, and/or consequences associated with a false positive or false negative. The decision provider can use information retrieved from risk constraint source(s) 114 (and/or received from the client device(s) 108 and/or third-party service(s)) to make the decision.

Example Scenario

Figure 2:
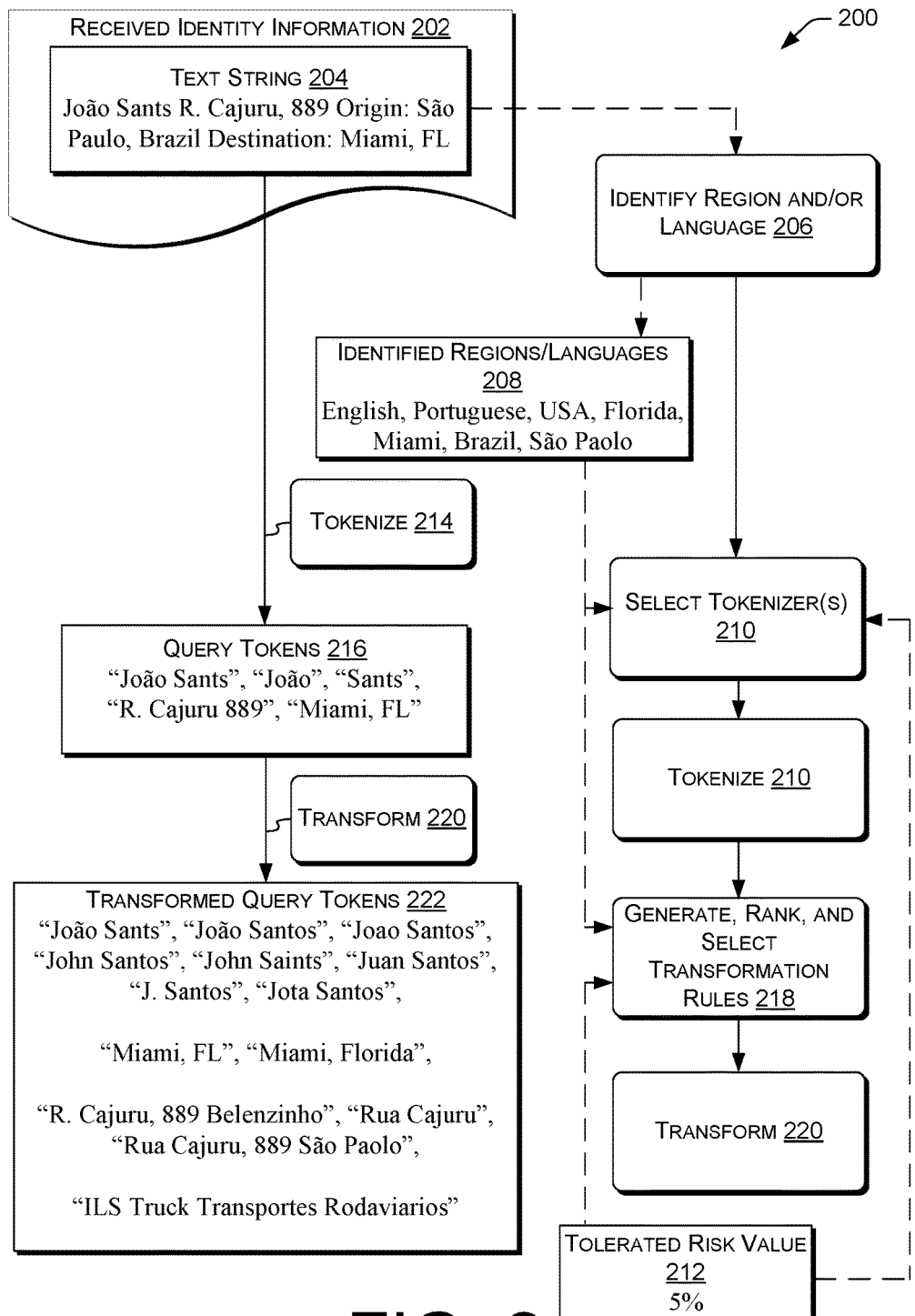
FIG. 2 is a block diagram depicting another example environment in which examples of robust matching for identity screening can operate.

FIG. 2 depicts an example scenario 200 implementing a portion of the techniques for example received identity information 202. FIG. 2 depicts data as boxes with sharp corners and process steps as boxes with rounded corners. Dashed lines illustrate the flow of data (i.e., data produced or data input) and solid lines represent the flow of the process and the data transformation, respectively. In some examples, received identity information 202 can include such as, for example, text, audio, images, video, etc. In some examples, the ISF can include modules to convert or extract textual identity information from audio, images, and/or video. In scenario 200, the received identity information 202 includes the text string, "João Sants R. Cajuru, 889 Origin: São Paulo, Brazil Destination: Miami, Fla."

At 206, the ISF identifies (206) region(s) and/or language(s) (e.g., identified regions/languages 208) associated with the text string 204. In some examples, the ISF can receive the region and/or language. For example, a user can provide or request identity screening for a particular region and/or language. In some examples, as in scenario 200, the identity information can include patent region information (i.e., R. Cajuru, 889; São Paulo, Brazil; Miami, Fla.). In some examples, the ISF can detect a region and/or language associated with the received identity information 202. For example, if the text string didn't include the above-mentioned patent region information, the ISF can, by natural-language processing, detect a language of the text string 204 and regions associated with that language. In scenario 200, for example, the ISF can detect that João is a Portuguese name and is therefore implicitly associated with regions where Portuguese is spoken or where Portuguese names are used. The ISF can use common vocabulary dictionaries to detect the language/region. The ISF can also use natural language processing to identify symbols and symbol arrangements (i.e., spellings) common to particular languages.

In some examples, other received or retrieved information can disambiguate which region(s) are associated with the received identity information such as, for example, user input, a location of the screening, and/or metadata associated with a screening request including the received identity information (e.g., an IP address from which the screening request is received, a language of metadata of the request, time stamp information (to infer a time zone), etc.). In scenario 200, the ISF could identify one or more of Brazil, São Paulo, Belenzinho (a neighborhood of São Paulo corresponding to R. Cajuru 889), the United States of America, Miami, and/or Florida as regions associated with the received identity information and English and Portuguese as languages associated with the received identity information.

Once a region and/or language has been identified by the ISF, the ISF can select tokenizer(s) (210) corresponding to at least a subset of the identified region(s) and/or language(s) 208. In scenario 200, for example, the ISF could select both English and Portuguese tokenizers. In some examples, more tokenizers can be made available that are more specific to particular regions. For example, the ISF can include a Brazilian Portuguese tokenizer, a tokenizer for São Paulo, a tokenizer for Belenzinho, etc. based on the identification of the language, "Portuguese" and the regions "Brazil," "São Paulo," and "Belenzinho," respectively. The ISF can choose the specificity of the tokenizers based at least in part on a degree of variation between the tokenizers (e.g., a Brazilian Portuguese tokenizer may only vary by a few words or rules from a tokenizer for São Paulo) and the tolerated risk value 212 for the particular application (e.g., what false positive/false negative rate can be tolerated, potentially trading off speed for decreased false positive/false negative rates). In scenario 200 a tolerated risk value 212 of 5% has been received.

Once the ISF has selected the tokenizer(s), the tokenizer(s) 210 can tokenize (214) the text string 204 to obtain query tokens 216. In scenario 200, the ISF can then generate, rank, and select transformation rules (218) in order to transform (220) the query tokens 216 to obtain transformed query tokens 222. In some examples, in order to generate, rank, and select transformation rules (218), the ISF can submit the query tokens 216 and a subset of the identified regions and languages 208 to a transformation provider. In some examples, the ISF can additionally provide contextual information to the transformation provider. For example, the contextual information can include search results based on region data, metadata associated with the request for identity screening, search results based on the query tokens, data inferred from the identity information (e.g., estimated age, gender, ethnicity/cultural context, etc.), social media data, etc.).

The transformation provider can use the query tokens 216, the subset of the identified regions and languages 208, and, in some examples, contextual information to generate applicable transformation rules, rank the applicable transformation rules according to a criteria, select the top k rules, and apply the top k rules to the query tokens 212 to receive the transformed query tokens 216. The ranking criteria can include, for example, one or more of an edit distance between the original and transformed tokens, prioritizing language or region-specific synonyms over edit distance criteria (e.g., synonyms will often produce a large edit distance, for example, "William"→"Bill" has a large edit distance, whereas "Sants"→"Santos" has a comparatively small edit distance), prioritizing customized rules over rules generated by the ISF, etc. In some examples, the rules can be ranked in order of smallest edit distance to largest edit distance up to a specified edit distance and relevant synonym rules can be placed at the top of the list before selecting the top-k rules. Here, "relevant" synonym rules can be rules having a prefix that matches or is within a specified edit distance or similarity value of at least one of the query tokens. For example, the synonym transformation rules, "William"→"Bill" and "Will"→"Bill", both share prefixes with "Will" and could therefore be prioritized at the top of the generated transformation list. A search for such rules can be conducted before or after generating the list.

FIG. 2 depicts the results of the applying the following possible transformation rules for this scenario:
- "João Sants" transformation to "João Santos" because "João Santos" is within an edit distance of 1 from an entry that appears in the Brazilian record, (Santos is a common Brazilian name and would therefore more frequently appear in a Brazilian name-based record, which the transformation provider can take into account as part of the contextual information when it ranks and selects transformation rules);
- "João" transliteration to João (the English alphabet does not utilize tildes so reference records from the United States could contain a transliteration of João Santos that does not include the tilde);
- "João" translation to "John";
- "Santos" translation to "Saints";
- "João" translation to "Juan";
- "João Santos" abbreviation to "J. Santos";
- "João" transformation to diminutive form, "Jota", which incidentally corresponds to the Portuguese abbreviation in this case (jota is the Portuguese spelling for the letter, "J");
- "FL" transformation to synonym, "Florida";
- "R." transformation to abbreviation expansion, "Rua";
- "R. Cajuru 889" transformation to include identified contextual information or to complete an address, "R. Cajuru, 889 Belenzinho" or "Rua Cajuru, 889 São Paulo" (e.g., the ISF can provide contextual information such as, for example, region search results, to the transformation provider);
- "R. Cajuru 889" transformation to remove potentially extraneous numerals, "Rua Cajuru"; and
- Transformation based on contextual information received from the ISF (e.g., region search for "R. Cajuru 889" returns a business named, "ILS Truck Transportes Rodaviarios Ltda") to return a sparse transformed query token that does not include commonly occurring words such as, for example, "Ltda," a common business formation abbreviation in Portuguese.

Example Processes

Figure 3:
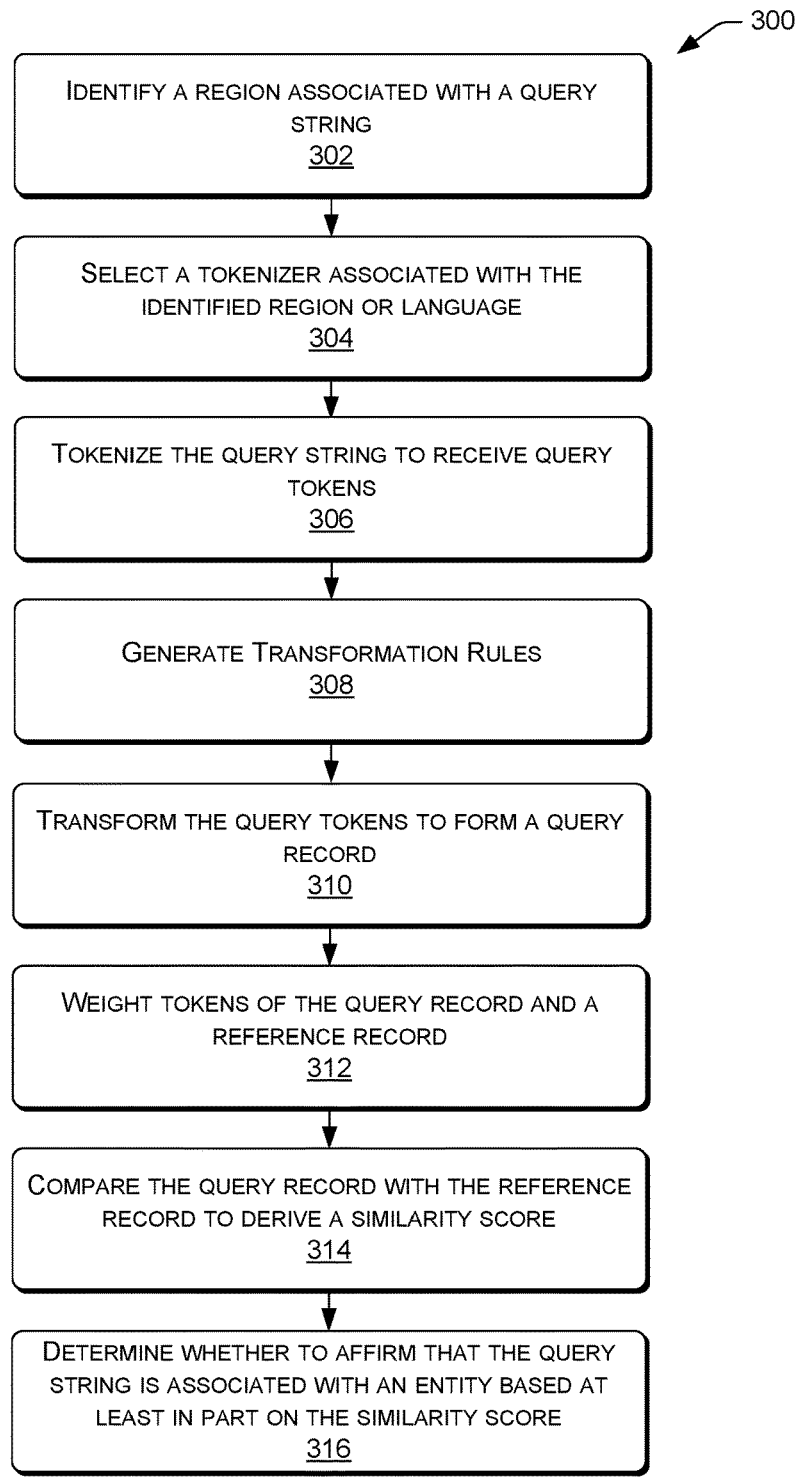
FIG. 3 is a flow diagram illustrating an example process to determine whether to affirm that a query string is associated with an entity.
Figure 4:
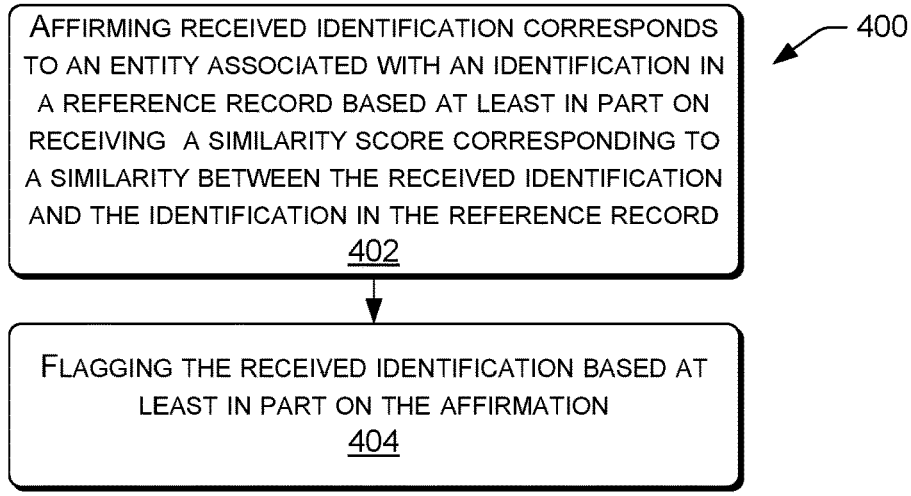
FIG. 4 is a flow diagram illustrating an example process to form a weighted query record and a weighted reference record.
Figure 5:
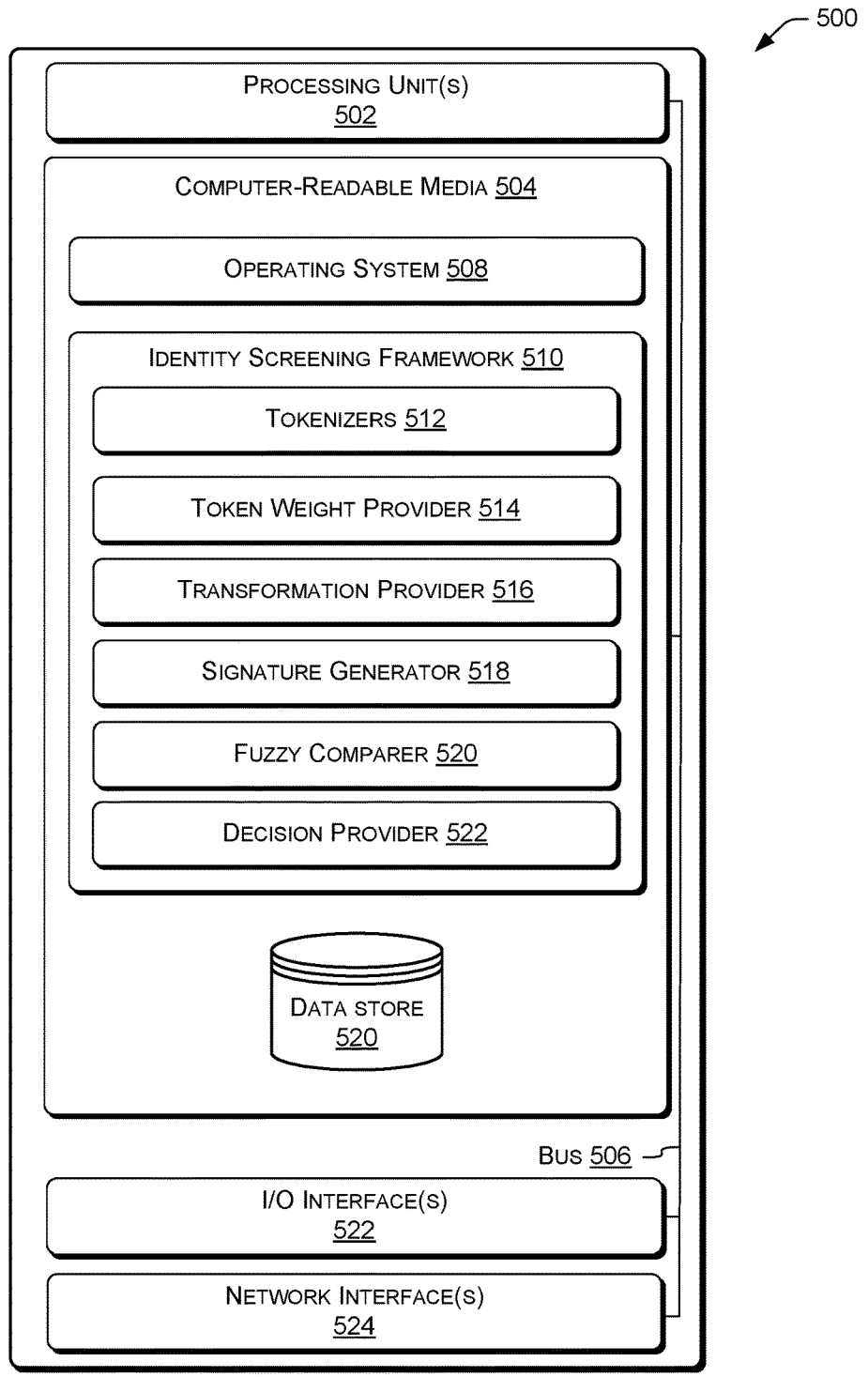
FIG. 5 is a flow diagram illustrating an example process to flag received identity information.

FIGS. 3-5 illustrate example processes 300, 400, and 500, respectively, which can be performed in whole or in part. These processes can, but need not be, performed in the environment 100 of FIG. 1, the scenario 200, and/or using the device 600 of FIG. 6.

FIG. 3 depicts an illustrative process 300 of implementing identity screening.

At 302, the ISF can identify a region associated with a query string. In some examples, the query string is provided as part of a request for identity screening from a client device 108. In some examples, the query string is derived from identity information. For example, the identity information may contain extraneous information (e.g., the request is written as prose and the ISF can detect, via natural language processing, relevant portions for which screening is sought, which the ISF creates a query string for) or it may be in an at least partly non-textual format (e.g., an image of a passport or a form, audio, video, etc.), which the ISF converts to a query string via optical character recognition, audio-to-text, video-to-text, or a computer vision API (e.g., to recognize objects, faces, emotions, etc.).

In some examples, the ISF can identify a region associated with a query string. In some examples, the region may be strongly associated with the query string and in other examples the region may be weakly or inferentially associated with the query string. For example, a request for identity screening including the query string "João Santos, 123 Main Ave, New York, N.Y." includes strongly associated region data, "123 Main Ave, New York, N.Y." Portuguese-speaking neighborhoods of New York and Portuguese-speaking nations or portions of nations may be inferentially associated with the identity information, "João Santos" based on detection by the ISF, via natural language processing, of an association of the name "João Santos" with Portuguese. In some examples, the ISF can identify a language associated with Unicode characters or arrangements of Unicode characters (e.g., Japanese Unicode characters, symbols unique or more common to a region, etc.).

In some examples, the ISF can use structured, semi-structured, or unstructured data such as, for example, web tables, Excel sheets, reference records (e.g., a blacklist including names and addresses; business formation information; city property information; etc.), etc., to predict a likelihood that a region is associated with identity information. For example, the ISF can model the structured data as a probabilistic database, in some examples, or use the structured data as training data for classifiers in order to predict attribute associations.

In some examples, the ISF can model the structured data as a probabilistic database by receiving tokens and labels. The ISF can use this data to generate probabilities that the tokens are associated with the labels (e.g., token, "Mr" has a probability of 1 of being associated with the label, "Title," whereas "Clinton has" a probability of 0.33 of being associated with the label, "First Name," and a probability of 0.67 of being associated with the label, "Last Name," based on. Based on these probabilities, the ISF can then parse the tokens to identify region information and potential associations between the region information and the received query string. For example, the ISF can use this method to identify region data within the query string itself, such as "123 Main Ave, New York, N.Y." discussed above. In some examples, the ISF can use this method to infer that region information is associated with the query string by meeting a threshold probability that a region label is associated with identity information or information structurally related to the identity information (e.g., a word having a threshold probability that it is associated with a region label (e.g., "region," "country," "city," "neighborhood," etc.) appears in the same row as identity information, such as a name). The ISF can use any other suitable method to identify a region associated with a query string. For example, the ISF can query a mapping API (e.g., Bing Maps API, Google Maps API, etc.), supply the query string or tokens of the query string and receiving associated locations from the mapping API.

At 304, the ISF selects tokenizer(s) associated with the identified region(s) and/or language(s) according to any of the techniques discussed herein. In some examples, multiple tokenizers can region(s) and/or language(s) associated therewith to facilitate selecting tokenizers that correspond to a the identified region(s) and/or language(s).

At 306, the ISF provides the query string to the selected tokenizer(s) and the tokenizer(s) tokenize the query string to obtain query tokens. Tokens can vary in size and the breaks made between tokens, which delimit the tokens, depend on the selected tokenizer. Tokens can be symbols, parts of words, words, strings, etc. In some examples, tokens that are so common as to be unlikely to be helpful in verifying an identity can be removed as a part of this step. For example, articles ("the", "of", etc.) and business formation identifiers ("Corp.", "Corporation", "LLC") can be removed. In some examples, these tokens can be re-inserted after transforming at 310 and/or after no matches are found at 314. In some examples, the highly common tokens can be re-inserted for low risk tolerance values (e.g., risk tolerance values of less than 2%).

At 308, the ISF can provide the identified region(s) and/or language(s) to a transformation provider, which can generate transformation rules according to any of the techniques discussed herein. Generally, transformation rules can generate a new set of strings for any given strings. In some examples, two strings can be considered similar if some pair of strings generated from the original strings is similar. In some examples, a transformation rule can consists of a pair (context, production) where production is of the form lhs→rhs. In some examples, context, lhs, and rhs can be strings. In some examples rhs is NULL. A production without a corresponding context is a context-free transformation. For example, "Bill"→"William" is a context-free transformation, whereas 33027, "SW 154th Ave"→"Lacosta Dr E" is a context-sensitive transformation.

In some examples, the transformation provider can generate transformation rules by finding similarities between query tokens and lhs strings (i.e., the left hand side string of the production rule). In some examples, the transformation provider can create and store new transformation rules based at least in part on one or more of query tokens, region(s), and/or language(s). In some examples, the transformation provider can create transformation rules by leveraging patent or latent associations in structured data; programmatically generating rules based at least in part on natural idiomatic structure; programmatically generating rules based at least in part on an edit distance; or by parsing unstructured data to create structured data and/or predicting associations of structured data with an attribute (e.g., computing probabilities that structured data is associated with an attribute and, if a given threshold probability is achieved, adding that attribute label and associated data to the structured data). In some examples, the transformation provider can use any of these techniques based at least in part on a region and/or language received from the ISF.

In some examples the transformation provider can create transformation rules from structured data by using associations to form production rules and contexts. For example, associations can include data that appears in a same row or column; labeled data; data pairs; data sets; etc. The transformation provider can use headers or similar data labels to guide a decision whether to use data as a production rule or as context. For example, a header of a first column in a table may include the token "Zip Code", a header of a second column in the table may include the token "Address", and a header of a third column in the table may include the token "Address Nickname". In this example, the transformation provider can use data in a row associated with the above-mentioned columns to form a transformation rule. The transformation provider could use first data associated with "Zip Code" data as the context; use second data associated with "Address" and the first data, as the lhs; and third data associated with "Address Nickname", the first data, and the second data, as the rhs of the production rule.

In another example, a header of a first column in a table may include the token "Abbreviation" and header of a second column may include the token "Expansion". In this example, the transformation provider can use the data associated therewith to form a context-free transformation that utilizes data associated with "Abbreviation" as the lhs and data associated with "Expansion" as the rhs of the production rule.

In some examples, the transformation provider can programmatically create transformation rules. In some examples, natural idiomatic structure can be used to create transformation rules. For example, in English, to convert cardinals to an abbreviated ordinal any number ending in 1, 2, 3, or any number from 4 to 9, the resultant abbreviated ordinal will end in "*st*", "*nd*", or "*th*", respectively. The transformation provider can use this natural idiomatic structure to develop the transformation rules.

In some examples, the transformation provider can programmatically generate rules based at least in part on an edit distance. The edit distance can be, for example, a Hamming distance, Levenstein distance, Jaro distance, Jaccard similarity, cosine similarity, edit distance, and/or a Euclidean distance, among others), between a lhs token and a rhs token. In some examples, the transformation provider can create transformation rules by programmatically altering a lhs using symbols of a region and/or language. For example, the transformation provider can create alternate representations by deleting a symbol from a token, exchanging a symbol of a token for a different symbol, and/or by adding a symbol. In some examples, the transformation provider can iterate this process for a subset or all of the symbols of a region and/or language. In some examples, the transformation provider can choose the subset of the symbols based at least in part on one or more of: frequently added symbols for the region and/or language, frequent spelling mistakes, symbols typically appearing near each other for input methods (e.g., "W", "E", "R", "F", etc. for "D" on a QWERTY keyboard).

In some examples, the transformation provider can programmatically generate rules based at least in part on an edit distance by comparing tokens of a query record and reference record to find tokens that are within the edit distance. The transformation provider can then use a first token of the query record that is within an edit distance of a second token of the reference record to form the lhs of the production rule and the second token can form the rhs of the production rule. For example, a query token may be "Micro soft" and a token composing an entry in the reference record may be "Microsoft". By this method, the transformation provider can compare the query and reference records, identify "Micro soft" and "Microsoft" as being within a specified edit distance of each other, and creating a transformation rule "Micro soft" is the lhs and "Microsoft" is the rhs (i.e., "Micro soft"→"Microsoft").

The ISF can have some measure of control over performance versus accuracy by the specificity of the region(s) and/or language(s) that the ISF provides to the transformation provider. The ISF can modulate the specificity of the region(s) and/or language(s) based at least in part on a tolerated risk value, for example. In some examples, the ISF can also provide the query tokens to the transformation provider for the transformation provider to generate rules.

In some examples, the transformation provider can modulate the number of rules selected in a ranking and selecting method based at least in part on a tolerated risk value and/or variation between the generated rules. In some examples, the transformation provider can generate rules with greater regional and/or lingual sensitivity based at least in part on the tolerated risk value. For example, the following list of tokenizer rule sets increases in regional and lingual sensitivity: English, United States English, Southeastern United States English, Louisianan English, etc. The generated rules can reflect greater regional and/or lingual sensitivity by including rules for differences in synonyms, spellings, phenomes, etc. that reflect the regional and/or lingual specificity. For example, the ISF could provide "Soft Drink" and four different regions: "United States," "Northwest United States," "Utah," and "Southeast United States. Based on the region, the transformation provider can generate synonym rules for each of the regions respectively, "Soft Drink"→"Pop"; "Soda" for "United States"; "Soft Drink"→"Pop" for "Northwest United States"; "Soft Drink"→"Soda Pop" for "Utah"; "Soft Drink"→"Coke" for "Southeast United States." Regionally or linguistically sensitive disambiguation proves important for generating synonym rules. For example, the word "boot" in American English most commonly refers to a form of footwear, whereas in British English the word "boot" refers to the storage compartment of a vehicle. The transformation provider can therefore retrieve regional or lingual-specific definitions for tokens before generating transformation rules in order to account for idiomatic ambiguities. In some examples, the generated rules can include transformations of numerals to corresponding alphabetic representations (e.g., "1"→"one") and vice versa, entry error corrections (or, equivalently, edit transformations), abbreviation expansions (e.g., "St"→"Street") or contractions (e.g., "Street"→"St"), etc.

Moreover, the ISF can provide multiple regions and/or languages to the transformation provider so that the generated rules can account for difficulties that arise with comparing the query string with reference records across regions and/or languages. Identity information is often treated disparately when being used in another region. For example, an American named "John Smith" moving to Russia may generate records associated with "John Smith" that are transliterated and/or translated, potentially even multiple times. For example, "John Smith" translates to Russian as " Иван Кузнецов ," which transliterates back to English as any one or more of "Ivan Kuznetsov," "Ivan Kuzneyetsov," "Kuznetsoff," "Kouznetsov." "John Smith" transliterates to Russian as "Джон Смит ," which roughly transliterates to English as "Dzhon Smit." These alternate representations of the same name expose the difficulties with cross-regional or cross-lingual identity screening.

These variations are further aggravated by the idiomatic variations discussed above and allophones, phonemes, and/or nomenclature structure of particular languages that make the representation of identity information more unpredictable or inaccurate. For example, in English, the tokens "Jane M Brown" and "Jane E Brown" do not match based on a middle initial. However, for Arabic names, this is not always the case. For example, "Khalid Bin Hasan Bn Ahmad Fazul" can match "Khalid BinHasan Fazul" but not "Khalid BinAhmad Fazul" because the first "Bin Ahmad" refers to one's grandfather's name while the latter refers to one's father's name. The transformation rules can include nomenclature structure transformation rules that account for such variations.

In some examples, the ISF can identify language(s) and/or region(s) associated with pertinent reference records and provide these to the transformation provider. These languages and/or regions may differ from the language(s) and/or region(s) identified above. As used herein, pertinence of a reference record can depend on the use for which the identity screening is being done. In some examples, the transformation provider can use these and the other identified language(s) and/or region(s) to generate transliteration and/or translation rules.

In some examples, the generated transformation rules can have transformation costs associated therewith. In some examples, the transformation costs can be numeral values signifying a probability that the transformation corresponds to a natural variation of the language and/or region as discussed herein (e.g., a spelling mistake, a synonym, a likely translation of a word, a likely transliteration for a word) and/or a significance of variation between the untransformed token and the transformed token.

For example, the transformation "Bill"→"Will" is a natural variation of the word "Bill" in the English language so the transformation rule, "Bill"→"Will", may have a low transformation cost associated therewith, whereas "Bill"→"Dubya" may have a high transformation cost because it is less likely to be a natural or frequent variation in English. In some examples, these transformation costs can vary based on region. Transformation costs corresponding to the likelihood that a transformation correctly models the natural variations of a language in a region can vary based at least in part on a frequency.

In some examples, the transformation costs can correspond to a significance of variation between the untransformed token and the transformation token. For example, in this example, the transformation costs can be based at least in part on an edit distance between the transformed token and the untransformed token. For example, "Bill"→"Will" only varies "Bill" by one letter and would therefore have a low edit distance and correspondingly a low transformation cost. However, the edit distance between the tokens "Bill" and "William" is high and would correspond to a higher transformation cost via this method.

Therefore, in some examples, the process by which a transformation cost s calculated can depend at least in part on the rule for which the transformation cost is being calculated. For example, synonym rules, transliteration rules, and translation rules, among others, can be based at least in part on a probability that the application of the transformation results in a common variation of a language of a particular region or, for transliteration and translation, that the application of the transformation results in an acceptable and/or common transliteration or translation of the token. The probability can be based at least in part on a frequency with which the tokens are associated in a corpus of documents (e.g., web tables, dictionaries, thesaurus, library of various texts) or a reference record. In some examples, natural language processing and machine leaning can be used to detect associations between untransformed tokens and transformed tokens. In some examples, structured or unstructured data parsing and prediction, can be used to calculate probabilities that transformation rule in question results in a transformation that is common in the natural variations of a language of a particular region (discussed below in regard to auxiliary disambiguation services 324).

In some examples, the transformation costs can be a weight taken into account by the comparer but in order to not confuse weights of the tokens (discussed at 312) and weights of the applied transformation rules, weights for the applied transformation rules are referred to herein as "costs."

At 310, the transformation provider and/or the ISF transforms the query tokens using the generated transformation rules or a subset of the generated transformation rules, as discussed similarly above (e.g., by ranking and limiting the rules used to the top-k rules), to form a query record, which includes original query tokens and transformed query tokens. In some examples, transliteration and/or translation rules can be applied sequentially (i.e., applying a transformation rule to a token that has already been transformed by another transformation rule). For example, in order to decrease false positives and false negatives, the transformation provider can translate identity information and subsequently transliterate and/or reverse-translate the resultant translation. In some examples, no more than three transliterations or translation transformations are used for an instance where two languages and/or region pairs are provided to the transformation provider in order to prevent divergent data that may impact real-time performance. In some examples, when more than two languages and/or regions are provided to the transformation provider, this can be relaxed and the number of sequential translations or transliterations can be increased to N, N+2, or 2N+1 sequential transformations, where N represents the number of languages and/or regions provided to the transformation provider. The ISF can account for transliteration and translation variations in this manner.

In some examples, transformation rules of other types (non-transliteration or non-transformation rules) are not applied sequentially in order to prevent redundancies and divergent data. For example, transforming "Bill"→"Will" and "Bill"→"William" and conducting further synonym transformations for "Will" and "William" are unlikely to yield diverse and non-tangential tokens and risk redundant computation, which can impact real performance. Moreover, if edit rules are applied to tokens that have been transformed pursuant to an edit rule, the resultant tokens risk becoming tangential (i.e., having a low probability of being associated with entity associated with the identity information and/or not according with natural idiomatic variations of the region and/or language) and therefore increasing false negative and false positive rates.

In some examples, a special transformation rule can include an identifier that signifies that additional transformations can be applied to the resultant token(s) produced by applying the special transformation rule. In some examples, a certain class of transformation rules can be special in this manner (e.g., transliteration and transformation rules).

At 312, a token weight provider weights tokens of the query record and/or tokens of the reference record. In some examples, the weighting process is configured so that more unique tokens increase the similarity score. Tokens that are more unique are less likely to return a false positive or a false negative and more likely to be a true positive. For example, the tokens, "ACME", "Inc.", "John Smith", "Restaurant", etc. can be accorded low weights, whereas unique tokens such as uncommon foreign names or uncommon abbreviations can be accorded higher weights. In some examples, the token weight provider can calculate the inverse document frequency ("IDF") of tokens of the query record and/or tokens of the reference record in reference record(s) and/or a corpus of documents. The token weight provider can base weights for the tokens at least in part on IDFs calculated for the tokens. For example, the weight (w) of a token, t, appearing in a data set i (e.g., the $i^{th}$ column of a data set) can be $$w(t, i) = IDF(t, i) = \log\frac{|R|}{\text{freq}(t, i)},$$

where freq(t,i) is the number of tuples v in a reference relation, R, such that tok(v[i]) contains (e.g., how frequently the token, t, appears in i).

In some examples, the IDF can be calculated for appearance of a token in a corpus of documents corresponding to a region and/or language that is the same or similar to a region and/or language of a reference record to with the query record can be compared. In other words, the IDF can be calculated for a target region and/or language. This can account for instances where a token may be rare in one region and/or language but frequent in another region and/or language. In some examples, the IDF can be calculated for a corpus of documents corresponding to a region and/or language that is the same or similar to region(s) and/or language(s) associated with the query tokens composing the query record.

In some examples, weights may already be calculated for the reference record and the ISF can retrieve the reference record and the weights therefor. In some examples, the ISF can performing a reference extending and weighting processing comprising: selecting tokenizer(s) for the reference record based at least in part on an identified region and/or language, tokenizing the reference record using the selected tokenizer(s), generating transformation rules via a transformation provider, transforming tokens of the reference record to create an extended reference record, and calculating weights via the token weight provider for tokens of the extended reference record. In some examples, the ISF can perform this extending and weighting process for each query and/or for region(s) and/or language(s) for which this process has not previously been conducted for the particular reference record. In some examples, the ISF can store the extended and weighted reference record to enhance future performance. Extending the reference record by this process can decrease false positive and false negative rates. In some examples, the extending and weighting process can be done pre-emptively before run-time to ensure the ability to provide real-time identity screening. In some examples, a minimalized extending and weighting process includes: selecting tokenizer(s), tokenizing, and calculating weights, according to any of the techniques discussed herein. This minimalized process relies on the transformation of the query string to account for idiomatic variability and may enhance performance by reducing redundant processes conducted on the query string. In this manner, transformation of the query strings provides an "as-needed" basis for transformation.

Conversely, in some examples where the ISF generates an extended and weighted reference record, the extension of the reference record can account for the idiomatic variations that query token transformation may redundantly account for. In this example, a minimalized process for generating a query record can include: receiving a query string, selecting tokenizer(s), and tokenizing the query string to receive query tokens which form the query record, according to any of the techniques discussed herein.

At 314, a comparer of the ISF compares at least one token of the query record and one token of the reference record to derive at least one similarity score (e.g., a Jaccard similarity coefficient, Levenstein distance, Jaro distance metric, cosine similarity, etc.). In some examples, the similarity score can be derived between sets of tokens having same or similar associated attributes (e.g., a similarity score between sets of tokens associated both identified as names, for example comparing "John" "Smith" with other first and last name combinations). In some examples, the comparer can compare multiple reference records, where at least one reference record is associated with a region and/or language different from a second reference record. In some examples, the comparer can return tokens of a reference record having a similarity score over a score threshold (e.g., a specified Jaccard similarity coefficient value such as, for example, 0.82).

In some examples, the score threshold can be adjusted based at least in part on a risk tolerance value (e.g., a received desired false negative or false positive; a control probability from a signature generator that all fuzzy matches have been found, which can correspond to the risk tolerance value, etc.). The comparer can use a lower risk tolerance value (e.g., an aversion to risk that the identity screening returns a false negative or a false positive that is reflected in a received risk tolerance value that is lower, e.g., <5%, <3%, <2% depending on the case) to adjust the score threshold. However, if the comparer reduces or increases the score threshold outside an optimal zone, false negative and/or false positive rates can rise. For example, if the score threshold is too high, false negatives are more likely and if the score threshold is too low, false positives are more likely. Machine learning and/or classifiers can be used to train the score threshold and the comparer can be configured to receive user input of truths to further refine the score threshold. In some examples, the optimal range of the score threshold is between 0.80 and 1.0.

In some examples, the signature generator can set a control probability at a user's direction. In some examples, a signature generator can vary the control probability (i.e., a constraint that the system will find all matches above a given threshold at a given false negative and/or false positive rate) based on at least two variables: the number of signatures generated (e.g., hash tables) and the dimensions per signature generated, which defines how specific each signature is. Increasing the value of these variables increase the size of the record index and may cause slower performance, but as they decrease the false negative probability decreases. The values of L and G to guarantee a particular false negative rate are effected by a Jaccard threshold setting (e.g., a threshold defined by a Jaccard similarity coefficient). For example, see Algorithm 1 below.

---

Algorithm 1

```
/// <summary>
/// Returns the number of hash tables (L) necessary to find matches ///
above minThreshold
/// with false negative probability 1 - successProb.
/// Note that in the absence of transformation rules, the number of ///
signatures generated for
/// record will equal L.
/// With transformations, each logical variant of the record will generate L
signatures. Most
/// variants will have a significant overlap in their signatures, reducing the
total number of
/// distinct signatures.
/// </summary>
/// <param name="nDimensions">The number of dimensions (G) for each
signature.
/// Increasing G makes the signatures more specific, but it may take more
hash tables (L) to
/// achieve /// the same successProb.</param>
/// <param name="minThreshold">The minimum similarity (e.g., Jaccard
similarity) that the /// signatures are tuned for.</param>
/// <param name="successProb">The probability that two records with
similarity above
```

-continued

Algorithm 1

```
/// minThreshold have at least one signature in common.</param>
/// <returns></returns>
public static int NumHashTables(int nDimensions, double minThreshold,
double successProb)
{
    if (minThreshold == 1.0)
    {
        return 1;
    }
    double numerator = Math.Log(1.0 - successProb);
    double denominator = Math.Log(1.0 - Math.Pow(minThreshold,
nDimensions));
    if (0 == denominator)
        return 100; // Return a large number of hash tables
    return Convert.ToInt32(Math.Ceiling(numerator / denominator));
}
/// <summary>
/// Returns the probability that two records with Jaccard similarity
/// above minThreshold have at least one signature in common for the
/// specified signature settings.
/// </summary>
/// <param name="nDimensions">The number of dimensions for each
/// signature</param>
/// <param name="nHashTables">The number of hash tables</param>
/// <param name="minThreshold">The minimum Jaccard
similarity</param>
/// <returns></returns>
public static double SuccessProbability(int nDimensions, int nHashTables,
double minThreshold)
{
  return 1.0 - Math.Pow(1.0 - Math.Pow(minThreshold, nDimensions),
nHashTables);
}
```

The following table illustrates example values for L and G given a score threshold ("T") (e.g., a Jaccard similarity score) at a fixed false negative probability ("P") (e.g., risk tolerance) of 5% (e.g., a risk tolerance value). In some examples, the signature generator can use an L value of 6 and a G value of 4 to generate signatures.

TABLE 1

| L: 5 G: 3 T: 0.8 P: 0.95 | L: 6 G: 3 T: 0.75 P: 0.95 | L: 8 G: 3 T: 0.7 P: 0.95 |
| L: 6 G: 4 T: 0.8 P: 0.95 | L: 8 G: 4 T: 0.75 P: 0.95 | L: 11 G: 4 T: 0.7 P: 0.95 |
| L: 8 G: 5 T: 0.8 P: 0.95 | L: 12 G: 5 T: 0.75 P: 0.95 | L: 17 G: 5 T: 0.7 P: 0.95 |
| L: 10 G: 6 T: 0.8 P: 0.95 | L: 16 G: 6 T: 0.75 P: 0.95 | L: 24 G: 6 T: 0.7 P: 0.95 |
| L: 13 G: 7 T: 0.8 P: 0.95 | L: 21 G: 7 T: 0.75 P: 0.95 | L: 35 G: 7 T: 0.7 P: 0.95 |
| L: 17 G: 8 T: 0.8 P: 0.95 | L: 29 G: 8 T: 0.75 P: 0.95 | L: 51 G: 8 T: 0.7 P: 0.95 |
| L: 21 G: 9 T: 0.8 P: 0.95 | L: 39 G: 9 T: 0.75 P: 0.95 | L: 73 G: 9 T: 0.7 P: 0.95 |
| L: 27 G: 10 T: 0.8 P: 0.95 | L: 52 G: 10 T: 0.75 P: 0.95 | L: 105 G: 10 T: 0.7 P: 0.95 |

In some examples, the comparer can use fuzzy joins as described in U.S. Patent Application No. 2013/0091120 to determine a similarity value. In some examples, instead of comparing tokens directly, a signature generator can generate signatures for the tokens of the query record and the reference record. For example, the signature generator can use locality-sensitive hashing (LSH) to create signatures which the comparer compares to determine a similarity score, as described in U.S. Patent Application No. 2013/0091120 and/or U.S. Pat. No. 8,606,771.

In some examples, the comparer can use the weights and costs discussed herein to normalize the similarity score based at least in part on a region and/or language. In some examples, the comparer can compare signatures generated for tokens of the query record and of the reference record. As used herein, references to comparing tokens can include comparing signatures of the tokens. In one example where the comparer uses Jaccard containment to determine similarity values between a first set of tokens (e.g., a query record), $s_1$, and a second set of tokens (e.g., a reference record), $s_2$, the comparer can use the token weights of the tokens of the sets, $wt(s_1)$ and $wt(s_2)$, respectively, as values used for the comparison $$\left(\text{e.g., } \frac{wt(s_1 \cap s_2)}{wt(s_1)}\right).$$

In some examples, the comparer can base the similarity cost at least in part on token weights and transformation costs of transformed tokens. For example, the comparer can calculate a normalized weight for a token based at least in part on a token weight and a transformation cost associated with the token. In some examples, the comparer can calculate a similarity score for a similarity between two tokens, u and v, based at least in part on the transformation costs and weights of the tokens by using $$1 - \min\left(\frac{tc(u, v)}{w(u)}, 1.0\right),$$

where tc is the transformation cost and w is the weight. Note that from here on, references to the "similarity score" for the rest of this discussion include the normalized similarity score discussed above.

In some examples, structured data, data parsing, and/or data prediction, as described in part above, can be used to modify similarity scores and/or to trigger a flag. For example, for a query token that meets a score threshold for similarity to a record token, if it is known that the query token of the query record is associated with a first label (e.g., a query token was entered into a field titled "First Name" and is therefore associated with the label "First Name") and it is known that the record token is associate with a second label (e.g., the record token appears in the reference record after an attribute and colon, such as, "Address:") then, based at least in part on a region and/or language associated with the query record and/or reference record, the ISF can adjust the similarity score or discard the query token/record token pair. In the example given above, the ISF can discard the query token/record token pair for not being a match that has logically associated labels.

In some examples, the ISF can also run a search to see if any transformation rules contain one of the labels as the lhs and contain the other label as the rhs of the same production rule. If that is the case, the ISF can maintain the similarity score. In some examples, ISF can also use parsing to predict the likelihood that different labels represent a same or similar attribute. For example, a query token could be associated with a label "L. Name" and a record token could be associated with a label, "Surname". Using the parsing techniques discussed above to determine a probability that the labels are associated with a specific attribute (e.g., a last name), the ISF can use the probability that the labels are associated to determine a scalar by which to multiply the similarity threshold. In another example, the ISF can use a first and/or a second threshold and the probability that the labels are associated with a specified attribute to determine whether to discard, modify, or maintain the similarity score. For example, if the probability is below the first threshold, the ISF can discard the query token/record token pair; if the probability is between the first threshold and the second threshold (the second threshold being greater than the first threshold), the ISF can decrease the similarity score; and if the probability is above the second threshold, the ISF can maintain the similarity score.

In some examples, the ISF can use the identified region and/or language to decide whether to discard, modify, or maintain the similarity score. For example, in English, people will sometimes choose to go by a middle name, so some records may have a middle name represented as a first name and other records may have the middle name recorded properly. In some examples, the ISF can use a transformation rule and/or a manner in which a transformation rule was created to discard, modify, or maintain the similarity score. However, this practice does not hold for all languages. For example, in Arabic, an individual might have a high common personal name such as "Mohammed." In certain regions of the world, "Mohammed" is so frequent that it is abbreviated using varying conventions depending on the region (e.g., "Md. Dinar ibn Raihan", "Mohd. Umair Tanvir", etc.). In some regions, Arabic names may include patronymics that can be leveraged for further data or to make a determination about a similarity score (e.g., "ibn" and/or "bin" signify "son" and are followed by the given name of the individual's Father).

To give an example where the ISF might take into account a region, language, and transformation rule all at once in determining whether to discard, modify, or maintain a similarity score, the identified regions are China and the United States; the identity information includes an age, 92; query tokens, "Li", associated with the label "Xing" (i.e., pinyin for the Chinese word for "surname"), and "Bik" associated with the label "ming" (i.e., pinyin for the Chinese word for "personal name"); a reference tokens, "Lee", associated with the label "F. Name", and "Bick", associated with the label "L. Name"; and a transformation rule based on China and the United States being the identified regions that transposes first and last name data. In this example, it appears at first that a similarity score between the tokens "Li" (a surname) and "Lee" (a first name) and "Bik" (a given name) and "Bick" (a last name) should be reduced or the pair discarded. However, because of the transformation rule, the ISF can decide to maintain the similarity score.

At 316, the ISF can determine whether to affirm that the query string corresponds to an entity based at least in part on the similarity score. In some examples, the query string is or is derived from identity information received that may correspond with the entity and for which identity screening is sought. In other words, at 316, the ISF determines whether or not to affirm that the received query string is associated with an entity (e.g., an individual, business, a network identity). In some examples, t an affirmation by the ISF includes a suggestion to flag an entity (e.g., in an example where the reference record contains entities that pose a risk). In some examples, an affirmation by the ISF includes a suggestion to pass an entity (e.g., where an affirmation of the identity is an affirmation that the entity is safe).

In some examples, deciding to affirm that the query string corresponds to an entity can be based at least in part on the similarity score and/or the normalized similarity score matching or exceeding a decision threshold. For examples where a Jaccard similarity is calculated, the decision threshold can be a number between 0.0 and 1.0. In some examples, the decision threshold is 0.7 or above.

In some examples, the decision can be based on a severity of the consequences of a false positive or false negative. Depending on the example for which identity screening is being used, this may operate differently. For example, in a scenario where identity screening is being used to determine whether or not to grant an entity access to a network resource, a sensitivity or importance designation of the network resource can modulate modify the decision (e.g., for a highly sensitive resource, such as a server with employee financial information stored thereon, the decision can be based on a high decision threshold (e.g., 0.90, 0.95, 0.98 or higher, for a 0.0-1.0 similarity score system)). In some examples, the ISF can request additional information to disambiguate or clarify. For example, the ISF can request that a user input a birthdate or a business registration number, etc.

FIG. 4 depicts an illustrative process 500 of implementing identity screening.

At 402, the ISF identifies a region associated with a query string, according to any of the techniques described herein. In some examples, the ISF can identify the region based on queries to auxiliary disambiguation services discussed herein below.

At 404, the ISF selects a tokenizer associated with the identified region and a language associated with the identified region from among multiple tokenizers, according to any of the techniques described herein. In some examples, the ISF can determine a language associated with the identified region by querying the auxiliary disambiguation services. In some examples, the ISF can determine the language based at least in part on the query string.

At 406, the ISF generates transformation rules based at least in part on the identified region and/or language, according to any of the techniques described herein.

At 408, the ISF transforms, by one or more of the transformation rules, the query tokens to form a query record, according to any of the techniques described herein.

At 410, the ISF weights tokens of the query record and weight tokens of a reference record based at least in part on frequencies with which the tokens of the query record appear in the reference record and frequencies with which the tokens of the reference record appear in the reference record, respectively, according to any of the techniques described herein.

FIG. 5 depicts an illustrative process 500 of implementing identity screening.

At 502, the ISF receives an identification 402, according to any of the techniques described herein. For example, a user can enter the identification and send it, a camera can capture the identification and provide it to the ISF, or the ISF can receive the identification from a request from a networked device or from a packet in a stream of packets. The identification can include tokens, as discussed herein, or other any other type of information that can indicate attributes of an entity (e.g., an image of an identity card, a person, and/or a location).

At 504, the ISF receives a similarity score corresponding to a similarity between the received identification and an identification in a reference record, according to any of the techniques described herein. In some examples, the similarity score is weighted based at least in part on a region associated with the reference record and regional lingual traits associated with the region, according to any of the techniques described herein. In some examples, the At 506, the ISF affirms that the received identification corresponds to an entity associated with the identification in a reference record based at least in part on receiving the similarity score corresponding to a similarity between the received identification and the identification in the reference record, according to any of the techniques described herein. In some examples, the ISF can additionally or alternatively use auxiliary disambiguation services to decide whether to make the affirmation. Auxiliary disambiguation services can include, for example, location services, record databases, services to uncover latent and/or patent data, contextual information services, profile management services, accumulated entity wiki services, hardware forensic services, identity service providers (e.g., claims-based and/or attribute-based credentials provider such as, for example, U-Prove, Security Token Service, Active Directory Federation Services, Windows Identity Foundation, Kerberos, etc.), speech recognition services, linguistic analysis services, or biometric data prediction services (e.g., services that predict age, gender, nationality, etc. from a data input such as an image or vocal sample). These services can be called to detect discrepancies or correspondences that can help the ISF decide whether or not to make the affirmation.

For example, if the received identification includes a picture of an individual associated with the identification and a name of the individual. The ISF can receive a similarity score between the name of the individual and the identification in the reference record, according to any of the techniques herein, and the ISF can additionally call the biometric data prediction services, providing the picture to the services. In this example, the biometric data prediction services could return to the ISF a predicted gender of the individual based on the picture. If that predicted gender is different than a gender associated with the identification in the reference record, the ISF can choose to not affirm that the received identification corresponds to the entity associated with the identification in the reference record. In this example, the ISF could additionally or alternatively provide the received name to the services that uncover latent and/or patent data. These services can provide to the ISF a likelihood that the name is associated with a gender. If this gender is different than a gender associated with the identification in the reference record, the ISF can choose to not affirm that the received identification corresponds to the entity associated with the identification in the reference record.

In some examples, the ISF can weight auxiliary disambiguation discrepancies and/or correspondences differently depending on one or more of a reliability of the information, a magnitude with which the received disambiguation information corroborates or contradicts an affirmation In some examples, the reliability of the information can be effected by how likely the information is to change over time (e.g., an indication of a user's occupation is more likely to change than a user's gender and may therefore be weighted less), how recent the input data or the contextual data is (e.g., the ISF provides a picture (input data) taken 3 minutes before providing the picture to a service versus providing a picture taken 3 years before providing the picture to a service, a service indicates that a business was registered at a specified address 24 years ago (contextual data)), and the like.

In some examples, a magnitude with which the received disambiguation information corroborates or contradicts an affirmation can depend on a weight assigned to a specific auxiliary disambiguation service or weights assigned to specific outputs of a specific auxiliary disambiguation service output. For example, a prediction of a gender of an individual based on a picture can be assigned a lower weight than a prediction of an age of an individual based on the picture. In another example, outputs of a biometric data prediction service can be weighted lower than outputs received from a record database, such as, for example, a domain name service, a credit information service, a database including business formation data, etc.

At 508, the ISF flags the received identification based at least in part on the affirmation, according to any of the techniques described herein. In some examples, flagging the received identification can include warning of a potential risk associated with the entity with which the identification is associated. In some examples, flagging the received identification can include warning that not enough information is known in order to affirm the entity's identity, which poses a risk. In some examples, flagging the received identification can include requesting further information or prompting a user to input further data. In some examples, flagging the received identification can include denying access to a user that provided the identification (e.g., denying access to a physical region, a networked resource such as a particular server). In some examples, flagging the received identification can include validating, verifying, or authorizing a user that provided the identification.

Example Device

Figure 6:
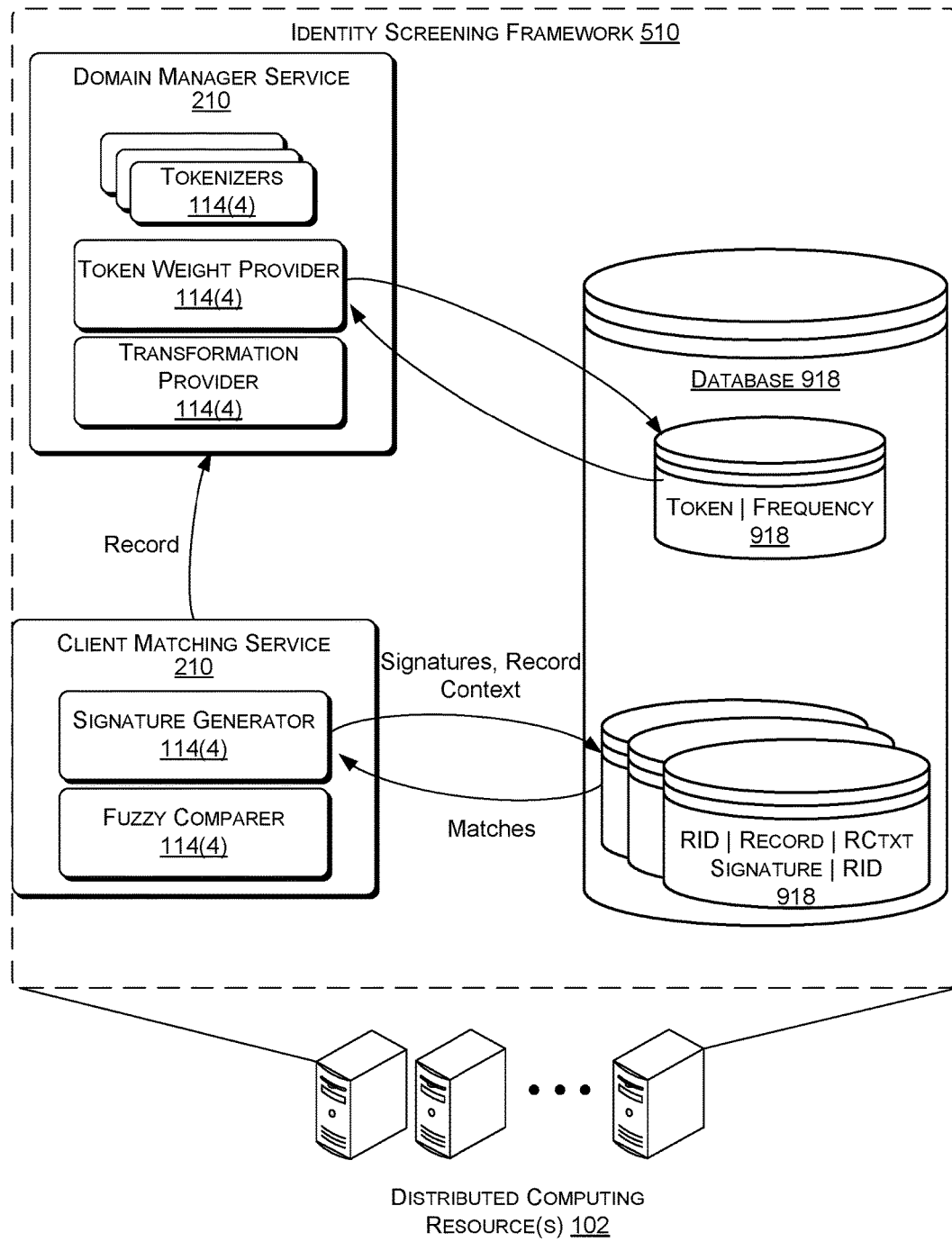
FIG. 6 is a block diagram depicting select components of an example device that can implement robust matching for identity screening, according to various examples.

FIG. 6 depicts select components of an example device 600, which can represent one or more of the distributed computing resources 102(1)-102(N), the client device(s) 108, other client device(s) 110, or other computing devices implementing some or all of the cross-mode communication techniques described herein. Example device 600 can include any type of computing device having one or more processing unit(s) 602 operably connected to computer-readable media 604. The connection may be via a bus 606, which in some instances may include one or more of a system bus, a data bus, an address bus, a PCI bus, a Mini-PCI bus, and any variety of local, peripheral, and/or independent buses, or via another operable connection. Processing unit(s) 602 can represent, for example, microprocessors, controllers or any other suitable type of processors for processing computer executable instructions to control the operation of the device in order to facilitate cross-channel communication. In some examples, where a system on a chip architecture is used, the processing unit(s) 602 can include one or more fixed function blocks (also referred to as accelerators) which implement a part of the method by employing an ISF 106 in hardware (rather than software or firmware).

The computer-readable media 604 includes two types of computer-readable media, namely computer storage media and communication media. Computer storage media can include volatile and non-volatile, non-transitory machine-readable, removable, and non-removable media implemented in any method or technology for storage of information (in compressed or uncompressed form), such as computer (or other electronic device) readable and/or executable instructions, data structures, program modules, and/or other data to perform processes or methods described herein. Computer storage media includes, but is not limited to hard drives, floppy diskettes, optical disks, CD-ROMs, DVDs, read-only memories (ROMs), random access memories (RAMs), EPROMs, EEPROMs, flash memory, magnetic and/or optical cards, solid-state memory devices, and/or other types of physical machine-readable media suitable for storing electronic instructions.

In contrast, communication media embodies computer-readable instructions, data structures, program modules, and/or other data in a modulated data signal, such as a carrier wave, and/or other transmission mechanism. As defined herein, computer storage media does not include communication media.

Example device 600 can include, but is not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, and/or any other sort of computing device such as one or more separate processor device(s), such as CPU-type processors (e.g., micro-processors), GPUs, and/or accelerator device(s).

In some examples, as shown regarding device 600, computer-readable media 604 can store instructions executable by the processing unit(s) 602, which can represent a CPU incorporated in device 600. Computer-readable media 604 can also store instructions executable by an external CPU-type processor, executable by a GPU, and/or executable by an accelerator, such as a field programmable gate array (FPGA)-type accelerator, a digital signal processing (DSP)-type accelerator, and/or any internal or external accelerator.

Executable instructions stored on computer-readable media 604 can include, for example, an operating system 608, an identity screening framework (ISF) 610, and other modules, programs, and/or applications that can be loadable and executable by processing units(s) 602. The ISF 106 can include the ISF 610 stored on device 600. ISF 106 and ISF 610 are used interchangeably herein since the ISF 610 often accomplishes the functionality of the ISF 106. The ISF 610 can include tokenizers 612, token weight provider 614, transformation provider 616, signature generator 618, fuzzy comparer 620, decision provider 622, and/or auxiliary disambiguation services 624. The techniques can be deployed in more or less modules. As mentioned above, the functionally described herein can be performed, at least in part, by one or more of the components discussed above (e.g., the tokenizers 612 can include the tokenizers discussed above; the decision provider 622 can make the decision to flag or to not flag, as discussed above, etc.)

In the illustrated example, computer-readable media 604 also includes a data store 626. In some examples, data store 626 includes data storage such as a database, data warehouse, and/or other type of structured or unstructured data storage. In some examples, data store 626 includes a relational database with one or more tables, indices, stored procedures, and so forth to enable data access. In some examples, the data store 626 can store query strings, query tokens, query records, reference records, transformation rules, document corpuses, etc. Data store 626 can store data for the operations of processes, applications, components, and/or modules stored in computer-readable media 604 and/or executed by processor(s) 602, and/or accelerator(s), such as modules 612-624. Alternately, some or all of the above-referenced data can be stored on separate memories such as memories of the distributed computing resource(s) 102 and/or client device(s) 108 a memory on board a CPU-type processor (e.g., microprocessor(s)), memory on board a GPU, memory on board an FPGA type accelerator, memory on board a DSP type accelerator, and/or memory on board another accelerator).

In some examples, the signature generator 618 can vary a control probability (i.e., a guarantee that the system will find all matches above a given threshold at a given false negative and/or false positive rate) based on at least two variables: the number of signatures generated (e.g., hash tables) (in the absence of transformation rules) ("L," herein) and the dimensions per signature generated ("G," herein), which defines how specific each signature is. Increasing the value of these variables increase the size of the record index and may cause slower performance, but as they decrease the false negative probability decreases. The values of L and G to guarantee a particular false negative rate are effected by a Jaccard threshold setting (e.g., a threshold defined by a Jaccard similarity coefficient). In some examples, the signature generator 618 can be configured to include an algorithm such as example Algorithm 1 above.

Table 1 above illustrates example values for L and G given a score threshold ("T") (e.g., a Jaccard similarity score) at a fixed false negative probability ("P") (e.g., risk tolerance) of 5% (e.g., a risk tolerance value). In some examples, the signature generator can use an L value of 6 and a G value of 4 to generate signatures.

In some examples the auxiliary disambiguation services 624 can include, for example, location services, record databases, services to uncover latent and/or patent data, contextual information services, profile management services, accumulated entity wiki services, hardware forensic services, identity service providers (e.g., claims-based and/or attribute-based credentials provider such as, for example, U-Prove, Security Token Service, Active Directory Federation Services, Windows Identity Foundation, Kerberos, etc.), speech recognition services, linguistic analysis services, or biometric data prediction services (e.g., services that predict age, gender, nationality, etc. from a data input such as an image or vocal sample). These services can be called to detect discrepancies or correspondences that can help the ISF decide whether or not to make the affirmation. In some examples, the auxiliary disambiguation services 624 can be stored entirely on the computer-readable media 604 or in part on the computer-readable media 604 as part of a distributive storage and processing method, and/or auxiliary disambiguation services 624 may be remotely accessible by the device 600 (e.g., the auxiliary disambiguation services 624 can be stored at one or more of distributed computing resource(s) 102, client device(s) 108, third-party service(s) 110, reference record source(s) 112, and/or risk constraint source(s) 114). For example, the device 600 could make calls to an application programming interface (API) corresponding to one of the auxiliary disambiguation services 624. In some examples, the API can be stored at the device 600 or, in other examples, at a remotely accessible location (e.g., via I/O interface(s) 628 and/or network interface(s) 630).

In some examples, the location services can include map services (e.g., Google Maps API, Bing Maps API, MapQuest), cell tower triangulation, global positioning systems, coordinate lookups). In some examples the record databases can include information associated with different forms of identification data such as, for example, birth record databases (e.g., associated with identification data such as names, birthdates, genders, birthplaces), business formation information databases, domain name service providers, postal service databases, reference record databases, and the like.

In some examples, services to uncover latent and/or patent data can include services that parse received tokens to form structured records associated attributes with the tokens and/or predict attributes and/or tokens that may be associated with parsed attributes and/or the tokens. For example, such a service can receive a string such as "Mr. Smith, John Clinton Al." In some examples, the service can tokenize the string into "Mr.", "John", "Smith", "Clinton", and "Al". A parsing portion of the service can identify from a corpus of a documents attributes with a highest likelihood of association with the tokens. For example, the parsing service can associate the attribute "Title" with "Mr."; "First Name" with "John", "Last Name" with "Smith", "City" or "Last Name" with "Clinton", and "State" or "First Name" with "Al". A prediction service can predict further attributes and/or tokens associated with attributes and/or tokens. For example, the prediction service can identify that there is a high frequency with which the attributes "First Name" and "Last Name" appear with the attribute "Gender", a predicted attributed) (i.e., attribute—attribute prediction) and/or the prediction service can predict token(s) associated with the predicted attribute, "Gender" based at least in part on the known tokens and/or attributes associated with the tokens (e.g., predict token "Male" for predicted attribute "Gender" based on tokens "John" and "Smith" and/or the associated attributes "First Name" and "Last Name"). For example, the token prediction can be modified based on the attribute as follows: if "Smith" was parsed as being associated with the attribute "City" then the prediction of the token associated with "Gender" will be effected by the frequency with which "John" is associated with "Male" and "Female" for records associated with the city, "Smith".

For example, the ISF can use parsing and prediction to detect what kind of identity information has been received and what kind of entity it may correspond to (e.g., an individual, a business, a device). Determining a likely type of entity with which identity information may correspond can help the ISF determine what services to call (e.g., for a "Business" attribute associated with the identity information, the ISF can call a mapping API to confirm an address of the Business and to see whether the mapping service has a record of a particular business at the address; and a business formation database).

In some examples, contextual information services can include services that provide further information about the identity screening context. Examples of such information can include a location from which the screening request is received, a target location (e.g., even if the request is received from one location, another location can be the target location such as a destination city, a particular building access point, a particular network access point, or other regions that are relevant to granting permission), a quantification of risk associated with returning a false positive or a false negative (e.g., this can be influenced by factors such as, for example, an associated monetary fee, jail time, sensitivity of a resource, elevation required to access a resource, a security level, worst case scenario analysis, likelihood and severity of bodily harm, likelihood or severity of harm to networked resource, likelihood of harm to credit score, etc.), history (e.g., whether this identity information has been seen before and whether or not it was affirmed), etc.

In some examples, the contextual information services can also include a wiki that aggregates information about entities based on services called and previous affirmations, flagging, and matching conducted, for example. In some examples, the contextual information services can also include profile services that allow entities to create an authorized party account that is verified. In some examples, the contextual information services can track authorized credentials as they pass from party to party. In some examples, the contextual information services can aggregate white and/or black lists. In some examples the contextual information services can include device forensics such as, for example, exposing a device IP, browser, Java version, Flash version, operating system, fonts, Acrobat version, plugin versions, processor class, SSL signatures, screen resolution, time zone, titles of tabs that are concurrently open, etc. In some examples, the contextual information services can include packet forensics such as, for example, metadata included in received packets of communication conducted in part to receive identity information.

In some examples, identity service providers can include claims-based and/or attribute-based credentials provider such as, for example, U-Prove, Security Token Service, Active Directory Federation Services, Windows Identity Foundation, Kerberos, etc. In some examples, linguistics analytics services can include natural language processing (e.g., part-of-speech tagging and parsing, concept identification, action identification, interpretation of intent), intelligent context services (e.g., building user-specific language models to understand intents, identification of cultural context of a user such as, for example, a nationality, education level, age, gender, cultural associations, region, disabilities, and/or other demographics). In some examples, biometric data prediction services can include that predict age, gender, nationality, etc. from a data input such as an image or vocal sample, and the like.

Device 600 can further include one or more input/output (I/O) interface(s) 628 to allow device 600 to communicate with input/output devices such as user input devices including peripheral input devices (e.g., a keyboard, a mouse, a pen, a game controller, a microphone or audio input device, a touch input device (e.g., touch screen, touch pad, etc.), a gestural input device, camera(s), and the like) and/or output devices including peripheral output devices (e.g., a display, a printer, audio speakers, a haptic output, bone conduction for audio sensation, and the like). In some examples, the I/O interface(s) 628 can be used to communicate with client device(s) 108 or other client device(s) 110. Device 600 can also include one or more network interface(s) 630 to enable communication between computing device 600 and other networked devices such as client device(s) 108 and/or other client device(s) 110. Such network interface(s) 630 can include one or more network interface controllers (NICs) and/or other types of transceiver devices to send and/or receive communications over a network, such as network(s) 104.

Example device 600 includes an example ISF 610 that can be distributively or singularly stored on device 600, which, as discussed above, can include one or more devices such as distributed computing resources 102(1)-102(N) and/or client device(s) 108. Some or all of the modules can be available to, accessible from, or stored on a remote device and/or distributed computing resources 102, which can be configured as a cloud services system. In some examples, an ISF 610 includes modules 612-624 as described herein that provide identity screening. In some examples, any number of modules could be employed and techniques described herein as employed by one or more modules can be employed by a greater or lesser number of modules.

Example Clauses

A. A system as recited in claim 1, further comprising: a signature generator configured to: generate, by the one or more processors, query signatures corresponding to the query record; index, by the one or more processors, the query signatures; generate, by the one or more processors, reference signatures corresponding to a reference record; and index, by the one or more processors, the reference signatures; and the comparer configured to: identify, by the one or more processors, candidate records from the index of signatures corresponding to the reference record, the candidate records corresponding to a one or more of the reference signatures that have signatures within an edit distance of the query signatures; and determine, by the one or more processors, similarity values between the transformed tokens of the query record and the candidate records.

B. A system as paragraph A recites, further comprising: a signature generator configured to: generate, by the one or more processors, query signatures corresponding to the query record; index, by the one or more processors, the query signatures; generate, by the one or more processors, reference signatures corresponding to a reference record; and index, by the one or more processors, the reference signatures; and the comparer configured to: identify, by the one or more processors, candidate records from the index of signatures corresponding to the reference record, the candidate records corresponding to a one or more of the reference signatures that have signatures within an edit distance of the query signatures; and determine, by the one or more processors, similarity values between the transformed tokens of the query record and the candidate records.

C. A system as either paragraph A or B recites, wherein a tokenizer of the multiple tokenizers is configured to: tokenize query strings in a first language, tokenize query strings in a second language, or tokenize query strings in the first language for a different dialect or cultural context.

D. A system as any of paragraphs A-C recite, wherein one or more transformation rules is configured to transliterate, by the one or more processors and based at least in part on the identified region or an identified language of the query string, the query string to obtain transliterated query tokens.

E. A system as any of paragraphs A-D recite, wherein the transformation rules include a list of synonym pairs corresponding to one or more of regions or languages; and wherein transforming the query tokens into the query record comprises populating, by the one or more processors, the query record with synonyms corresponding to a subset of the query tokens based at least in part on one or more of the identified region or an identified language.

F. A system as any of paragraphs A-E recite, wherein the synonym pairs further include synonym costs associated with the synonym pairs; and wherein the transformation provider is further configured to calculate, by the one or more processors, transformation costs based on one or more of synonym costs of synonym pairs used to transform the query tokens or edit distances between the query tokens and corresponding transformed query tokens, the edit distances including a quantification of how dissimilar.

G. A system as any of paragraphs A-F recite, the comparer further configured to: based at least in part on the transformation costs, modify, by the one or more processors, the similarity values to obtain modified similarity values; and average, by the one or more processors, the modified similarity values to receive a similarity score. A system as recited in claim 1, wherein the transformation provider selects the one or more transformation rules by: ranking, by the one or more processors, the transformation rules based at least in part on the identified region and the query tokens; selecting, by the one or more processors, a number of the transformation rules to receive the one or more transformation rules, where the number selected corresponds to a tolerated risk value.

H. A system as any of paragraphs A-G recite, the token weight provider assigning the token weights based at least in part on calculating an inverse document frequency of tokens included in the reference record.

I. A method comprising: identifying a region associated with a query string; based at least in part on the identified region and a language associated with the identified region: selecting, from multiple tokenizers, a tokenizer associated with the identified region or the language; and generating transformation rules based at least in part on the identified region and the language; tokenizing the query string by the tokenizer to receive query tokens; transforming, by one or more of the transformation rules, the query tokens to form a query record; and weighting tokens of the query record and weighting tokens of a reference record based at least in part on frequencies with which the tokens of the query record appear in the reference record and frequencies with which the tokens of the reference record appear in the reference record, respectively.

J. A method as paragraph I recites, wherein the identified region is a first region and the tokenizer is a first tokenizer, the method further comprising: identifying a second region associated with the query string; based at least in part on the second region and a language associated with the second region: selecting a second tokenizer associated with the second region and the language of the second region; and generating a second set of transformation rules based on the second region and the language of the second region; tokenizing the query string by the tokenizer to receive additional query tokens; transforming, by at least one of the transformation rules of the second set of transformation rules, the additional query tokens to form an addendum to the query record; and weighting tokens of the addendum based at least in part on frequencies with which the tokens of the addendum appear in the reference record.

K. A method as paragraph I or J recites, wherein a language associated with the first region and a language associated with the second region are different.

L. A method as any one of paragraphs I-K recite further comprising: retrieving a first reference record corresponding to the first region; and retrieving a second reference record corresponding to the second region.

M. A method as any one of paragraphs I-L recite, wherein the transformation rules include rules to transliterate or translate one or more of the query tokens, the additional query tokens, the first reference record, or the second reference record.

N. A method as any one of paragraphs I-M recite further comprising: determining a similarity score between a token of the query record and a token of the reference record by fuzzy matching tokens of the query record with tokens of the reference record, the fuzzy matching based at least in part on weights of the tokens of one or more of the query record or the reference record and transformation costs associated with the one or more transformation rules.

O. A method as any one of paragraphs I-N recite, wherein a weight of a token of the query record or the reference record includes an inverse document frequency of appearance of the token in the reference record.

P. A method as any one of paragraphs I-O recite, wherein the query string includes an identification of an entity and the reference record includes multiple entity identifications.

Q. A method comprising: receiving an identification; receiving a similarity score corresponding to a similarity between the received identification and an entity in a reference record, the similarity score: being weighted based at least in part on a region associated with the reference record and regional lingual traits associated with the region; and exceeding a score threshold; and affirming that the received identification corresponds to an entity associated with the identification in the reference record based at least in part on the similarity score; and flagging the received identification based at least in part on the affirmation.

R. A method as paragraph Q recites, wherein the score threshold corresponds to a threshold probability that the affirmation is a true positive and wherein flagging the received identification is an indication to either deny or grant a request by an entity supplying the received identification.

S. A method as either paragraph Q or R recites, wherein the region associated with the reference record is different than a region associated with the received identification and wherein the regional lingual traits associated with the region include at least one of: synonyms of the received identification related to the region; transliterations of the received identification related to the region; translations of the received identification related to the region; other variations of the received identification related to the region; or a frequency with which the received identification appears in the reference record or a corpus of documents.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system comprising:
   one or more hardware processors;
   multiple tokenizers configured to tokenize, by the one or more hardware processors and based at least in part on an identified region, a query string to receive query tokens;
   a transformation provider configured to:
     generate, by the one or more hardware processors, one or more transformation rules based at least in part on the identified region and the query tokens;
     rank, by the one or more hardware processors, the one or more transformation rules based at least in part on the identified region and the query tokens;
     select, by the one or more hardware processors, one or more of the transformation rules, wherein a number of the one or more transformation rules selected is based on the rank of the one or more transformation rules and a tolerated risk value; and
     transform, by the one or more hardware processors and based at least in part on the selected one or more transformation rules, the query tokens to obtain a query record including transformed tokens that account for regional token variations, the regional token variations being associated with the identified region; and
   a token weight provider configured to assign, by the one or more hardware processors, token weights for the transformed tokens of the query record based at least in part on the identified region;
   a comparer configured to determine, by the one or more hardware processors and based at least in part on the token weights, similarity values between the transformed tokens of the query record and a reference record.

2. The system as recited in claim 1, further comprising:
   a signature generator configured to:
     generate, by the one or more hardware processors, query signatures corresponding to the query record;
     index, by the one or more hardware processors, the query signatures;
     generate, by the one or more hardware processors, reference signatures corresponding to a reference record; and
     index, by the one or more hardware processors, the reference signatures; and
   the comparer configured to:
     identify, by the one or more hardware processors, candidate records from the index of signatures corresponding to the reference record, the candidate records corresponding to a one or more of the reference signatures that have signatures within an edit distance of the query signatures; and determine, by the one or more hardware processors, similarity values between the transformed tokens of the query record and the candidate records.

3. The system as recited in claim 1, wherein a tokenizer of the multiple tokenizers is configured to:
tokenize query strings in a first language,
tokenize query strings in a second language, or
tokenize query strings in the first language for a different dialect or cultural context.

4. The system as recited in claim 1, wherein the one or more transformation rules are configured to transliterate, by the one or more hardware processors and based at least in part on the identified region or an identified language of the query string, the query string to obtain transliterated query tokens.

5. The system as recited in claim 1,
wherein the transformation rules include a list of synonym pairs corresponding to one or more of regions or languages; and
wherein transforming the query tokens into the query record comprises populating, by the one or more hardware processors, the query record with synonyms corresponding to a subset of the query tokens based at least in part on one or more of the identified region or an identified language.

6. The system as recited in claim 5,
wherein the synonym pairs further include synonym costs associated with the synonym pairs; and
wherein the transformation provider is further configured to calculate, by the one or more hardware processors, transformation costs based on one or more of synonym costs of synonym pairs used to transform the query tokens or edit distances between the query tokens and corresponding transformed query tokens, the edit distances including a quantification of how dissimilar.

7. The system as recited in claim 6, the comparer further configured to:
based at least in part on the transformation costs, modify, by the one or more hardware processors, the similarity values to obtain modified similarity values; and
average, by the one or more hardware processors, the modified similarity values to receive a similarity score.

8. The system as recited in claim 1, the token weight provider assigning the token weights based at least in part on calculating an inverse document frequency of tokens included in the reference record.

9. A method comprising:
identifying a first region associated with a query string and a second region associated with the query string;
based at least in part on the identified first region and a language associated with the identified first region:
selecting, from multiple tokenizers, a first tokenizer associated with the identified first region or the language of the identified first region; and
generating a first set of transformation rules based at least in part on the identified first region and the language of the identified first region;
based at least in part on the identified second region and a language associated with the identified second region:
selecting, from the multiple tokenizers, a second tokenizer associated with the identified second region or the language of the identified second region; and
generating a second set of transformation rules based on the identified second region and the language of the identified second region;
tokenizing the query string by the first tokenizer to receive query tokens and the query string by the second tokenizer to receive additional query tokens;
transforming, by one or more transformation rules of the first set of transformation rules, the query tokens to form a query record;
transforming, by one or more transformation rules of the second set of transformation rules, the additional query tokens to form an addendum to the query record;
weighting tokens of the query record and weighting tokens of a reference record based at least in part on frequencies with which the tokens of the query record appear in the reference record and frequencies with which the tokens of the reference record appear in the reference record, respectively; and
weighting tokens of the addendum based at least in part on frequencies with which the tokens of the addendum appear in the reference record.

10. The method as recited in claim 9, wherein a language associated with the first region and a language associated with the second region are different.

11. The method as recited in claim 9, further comprising:
retrieving a first reference record corresponding to the identified first region; and retrieving a second reference record corresponding to the identified second region.

12. The method as recited in claim 11, wherein the transformation rules include rules to transliterate or translate one or more of the query tokens, the additional query tokens, the first reference record, or the second reference record.

13. The method as recited in claim 9, further comprising:
determining a similarity score between a token of the query record and a token of the reference record by fuzzy matching tokens of the query record with tokens of the reference record, the fuzzy matching based at least in part on weights of the tokens of one or more of the query record or the reference record and transformation costs associated with the one or more transformation rules.

14. The method as recited in claim 13, wherein a weight of a token of the query record or the reference record includes an inverse document frequency of appearance of the token in the reference record.

15. The method as recited in claim 9, wherein the query string includes an identification of an entity and the reference record includes multiple entity identifications.

16. A method comprising:
tokenizing, based at least in part on an identified region, a query string to receive query tokens;
generating one or more transformation rules based at least in part on the identified region and the query tokens;
ranking, by the one or more hardware processors, the one or more transformation rules based at least in part on the identified region and the query tokens;
selecting one or more of the transformation rules, wherein a number of the one or more transformation rules selected is based on the rank of the one or more transformation rules and a tolerated risk value;
transforming, based at least in part on the selected one or more transformation rules, the query tokens to obtain a query record including transformed tokens that account for regional token variations, the regional token variations being associated with the identified region;

assigning token weights for the transformed tokens of the query record based at least in part on the identified region;

determining, based at least in part on the token weights, similarity values between the transformed tokens of the query record and a reference record;

receiving an identification;

determining a similarity score corresponding to a similarity between the received identification and an entity in the reference record, the similarity score being weighted based at least in part on an identified region associated with the reference record and regional lingual traits associated with the identified region, and the similarity score exceeding a score threshold;

affirming that the received identification corresponds to an entity associated with the identification in the reference record based at least in part on the similarity score; and flagging the received identification based at least in part on the affirmation.

17. The method as recited in claim 16, wherein the score threshold corresponds to a threshold probability that the affirmation is a true positive and wherein flagging the received identification is an indication to either deny or grant a request by an entity supplying the received identification.

18. The method as recited in claim 16, wherein the identified region associated with the reference record is different than a region associated with the received identification and wherein the regional lingual traits associated with the identified region include at least one of:

synonyms of the received identification related to the identified region;

transliterations of the received identification related to the identified region;

translations of the received identification related to the identified region;

other variations of the received identification related to the identified region; or a frequency with which the received identification appears in the reference record or a corpus of documents.

* * * * *